(12) United States Patent
Deshpande

(10) Patent No.: US 11,856,231 B2
(45) Date of Patent: Dec. 26, 2023

(54) SYSTEMS AND METHODS FOR SIGNALING HYPOTHETICAL REFERENCE DECODER PARAMETERS IN VIDEO CODING

(71) Applicant: Sharp Kabushiki Kaisha, Osaka (JP)

(72) Inventor: Sachin G. Deshpande, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 198 days.

(21) Appl. No.: 17/613,523

(22) PCT Filed: May 26, 2020

(86) PCT No.: PCT/JP2020/020794
§ 371 (c)(1),
(2) Date: Nov. 23, 2021

(87) PCT Pub. No.: WO2020/241653
PCT Pub. Date: Mar. 12, 2020

(65) Prior Publication Data
US 2022/0264153 A1 Aug. 18, 2022

Related U.S. Application Data

(60) Provisional application No. 62/865,733, filed on Jun. 24, 2019, provisional application No. 62/864,398, filed on Jun. 20, 2019, provisional application No. 62/854,921, filed on May 30, 2019.

(51) Int. Cl.
*H04N 19/70* (2014.01)
*H04N 19/187* (2014.01)
*H04N 19/31* (2014.01)
*H04N 9/44* (2006.01)
*H04N 19/44* (2014.01)

(52) U.S. Cl.
CPC .......... *H04N 19/70* (2014.11); *H04N 19/187* (2014.11); *H04N 19/31* (2014.11); *H04N 19/44* (2014.11)

(58) Field of Classification Search
CPC ...... H04N 19/70; H04N 19/187; H04N 19/31; H04N 19/44
USPC .................................................... 375/240.26
See application file for complete search history.

(56) References Cited

U.S. PATENT DOCUMENTS

| 2014/0098895 A1* | 4/2014 | Wang ............... H04N 19/70 375/240.26 |
| 2022/0141488 A1* | 5/2022 | He .................. H04N 19/597 375/240.12 |

OTHER PUBLICATIONS

Official Communication issued in International Patent Application No. PCT/JP2020/020794, dated Jul. 21, 2020.
International Telecommunication Union, "Series H; Audiovisual and Multimedia Systems Infrastructure of audiovisual services—Coding of moving video, High efficiency video coding", ITU-T H.265, Dec. 2016, 662 pages.
Bross, "Working Draft 1 of Versatile Video Coding", Joint Video Experts Team (JVET)of ITU-T SG 16 WP 3 and ISO/IEC JTC 1/SC 29/WG 11, JVET-J1001-v2, Apr. 10-20, 2018, 39 pages.

(Continued)

*Primary Examiner* — Dominic D Saltarelli
(74) *Attorney, Agent, or Firm* — KEATING & BENNETT, LLP

(57) ABSTRACT

A device may be configured to signal hypothetical reference decoder parameters according to one or more of the techniques described herein.

5 Claims, 6 Drawing Sheets

(56) References Cited

OTHER PUBLICATIONS

Bross et al., "Versatile Video Coding (Draft 5)", Joint Video Experts Team (JVET) of ITU-T SG 16 WP 3 and ISO/IEC JTC 1/SC 29/WG 11, JVET-N1001-v7, Mar. 19-27, 2019, 382 pages.
Deshpande, "On HRD Signalling", Joint Video Experts Team (JVET) of ITU-T SG 16 WP 3 and ISO/IEC JTC 1/SC 29/WG 11, JVET-O0177, Jul. 3-12, 2019, pp. 1-6.
Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, Jul. 13-21, 2017, 51 pages.

\* cited by examiner

SYSTEMS AND METHODS FOR SIGNALING HYPOTHETICAL REFERENCE DECODER PARAMETERS IN VIDEO CODING

CROSS REFERENCE

This Nonprovisional application claims priority under 35 U.S.C. § 119 on provisional Application No. 62/854,921 on May 30, 2019. No. 62/864,398 on Jun. 20, 2019, No. 62/865,733 on Jun. 24, 2019, the entire contents of which are hereby incorporated by reference.

TECHNICAL FIELD

This disclosure relates to video coding and more particularly to techniques for signaling hypothetical reference decoder parameters for coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10$^{th}$ Meeting of ISO/IEC JTC1/SC29/WG11 16-20 Apr. 2018, San Diego, CA. From the multiple descriptions of video coding tools, a resulting initial draft text of a video coding specification is described in "Versatile Video Coding (Draft 1)." 10$^{th}$ Meeting of ISO/IEC JTC1/SC29/WG11 16-20 Apr. 2018, San Diego. CA, document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 5)," 14th Meeting of ISO/IEC JTC1/SC29/WG11 19-27 Mar. 2019, Geneva. CH, document JVET-N1001-v7, which is incorporated by reference herein, and referred to as JVET-N1001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of decoding video data, the method comprising: decoding a first syntax element in a sequence parameter set, wherein the first syntax element specifies whether a hypothetical reference decoder parameters syntax structure includes parameters for a temporal sub-layer with an identifier in a range of 0 to a maximum number of temporal sub-layers minus one or a hypothetical reference decoder parameters syntax structure includes parameters for a temporal sub-layer with an identifier equal to a maximum number of temporal sub-layers minus one only; defining a starting sub-layer for the hypothetical reference decoder parameters syntax structure according to a value of the first syntax element; and decoding each of the parameters in the hypothetical reference decoder parameters syntax structure by using the starting sub-layer and a maximum number of sub-layers.

In one example, a method of encoding image data, the method comprising: encoding a first syntax element in a sequence parameter set, wherein the first syntax element specifies whether a hypothetical reference decoder parameters syntax structure includes parameters for a temporal sub-layer with an identifier in a range of 0 to a maximum number of temporal sub-layers minus one or a hypothetical reference decoder parameters syntax structure includes parameters for a temporal sub-layer with an identifier equal to a maximum number of temporal sub-layers minus one only; defining a starting sub-layer for the hypothetical reference decoder parameters syntax structure according to a value of the first syntax element; and encoding each of the parameters in the hypothetical reference decoder parameters syntax structure by using the starting sub-layer and a maximum number of sub-layers.

In one example, a decoder of decoding video data, the decoder comprising: a processor, and a memory associated with the processor; wherein the processor is configured to perform the following steps: decoding a first syntax element in a sequence parameter set, wherein the first syntax element specifies whether a hypothetical reference decoder parameters syntax structure includes parameters for a temporal sub-layer with an identifier in a range of 0 to a maximum number of temporal sub-layers minus one or a hypothetical reference decoder parameters syntax structure includes parameters for a temporal sub-layer with an identifier equal to a maximum number of temporal sub-layers minus one only; defining a starting sub-layer for the hypothetical reference decoder parameters syntax structure according to a value of the first syntax element; and decoding each of the parameters in the hypothetical reference decoder parameters syntax structure by using the starting sub-layer and a maximum number of sub-layers.

In one example, a encoder of encoding video data, the encoder comprising: a processor, and a memory associated with the processor; wherein the processor is configured to perform the following steps: encoding a first syntax element in a sequence parameter set, wherein the first syntax element specifies whether a hypothetical reference decoder parameters syntax structure includes parameters for a temporal sub-layer with an identifier in a range of 0 to a maximum number of temporal sub-layers minus one or a hypothetical reference decoder parameters syntax structure includes parameters for a temporal sub-layer with an identifier equal to a maximum number of temporal sub-layers minus one only; defining a starting sub-layer for the hypothetical reference decoder parameters syntax structure according to a value of the first syntax element; and encoding each of the parameters in the hypothetical reference decoder parameters syntax structure by using the starting sub-layer and a maximum number of sub-layers.

DESCRIPTION OF EMBODIMENTS

Figure 1:
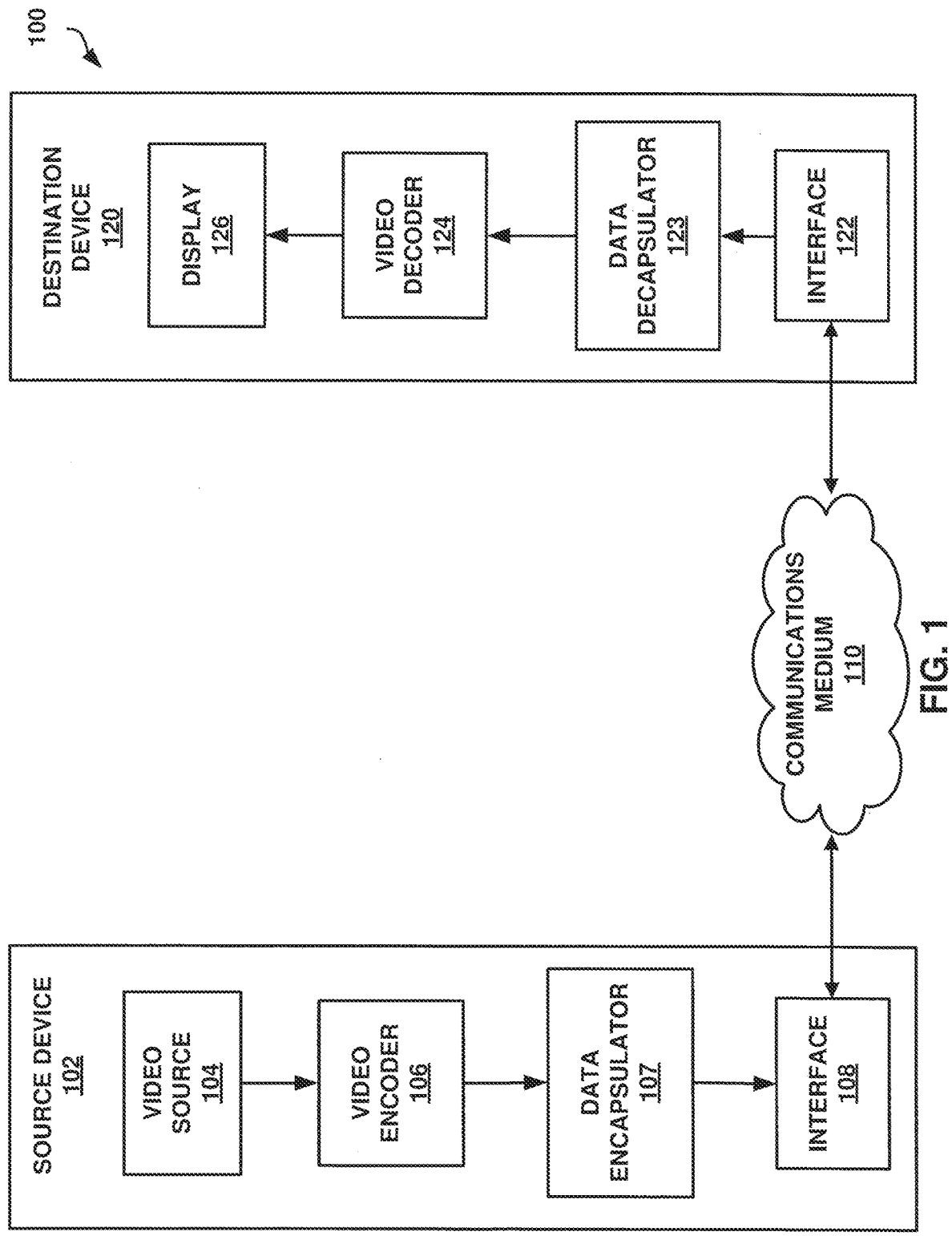
FIG. 1 is a block diagram illustrating an example of a system that may be configured to encode and decode video data according to one or more techniques of this this disclosure.

In general, this disclosure describes various techniques for coding video data. In particular, this disclosure describes techniques for signaling hypothetical reference decoder parameters for coded video data. It should be noted that although techniques of this disclosure are described with respect to ITU-T H.264, ITU-T H.265, JEM, and JVET-N1001, the techniques of this disclosure are generally applicable to video coding. For example, the coding techniques described herein may be incorporated into video coding systems. (including video coding systems based on future video coding standards) including video block structures, intra prediction techniques, inter prediction techniques, transform techniques, filtering techniques, and/or entropy coding techniques other than those included in ITU-T H.265, JEM, and JVET-N1001. Thus, reference to ITU-T H.264, ITU-T H.265, JEM, and/or JVET-N1001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of encoding video data comprises signaling a flag, wherein the value of the flag indicates whether respective instances of HRD parameters are signaled for each temporal sub-layers of video data or whether a single instance of HRD parameters is signaled for the all the temporal sub-layers of the video data, and signaling a number of instances of HRD parameters according to the number temporal sub-layers of the video data and the value of the flag.

In one example, a device comprises one or more processors configured to signal a flag, wherein the value of the flag indicates whether respective instances of HRD parameters are signaled for each temporal sub-layers of video data or whether a single instance of HRD parameters is signaled for the all the temporal sub-layers of the video data, and signal a number of instances of HRD parameters according to the number temporal sub-layers of the video data and the value of the flag.

In one example, a non-transitory computer-readable storage medium comprises instructions stored thereon that, when executed, cause one or more processors of a device to signal a flag, wherein the value of the flag indicates whether respective instances of HRD parameters are signaled for each temporal sub-layers of video data or whether a single instance of HRD parameters is signaled for the all the temporal sub-layers of the video data, and signal a number of instances of HRD parameters according to the number temporal sub-layers of the video data and the value of the flag.

In one example, an apparatus comprises means for signaling a flag, wherein the value of the flag indicates whether respective instances of HRD parameters are signaled for each temporal sub-layers of video data or whether a single instance of HRD parameters is signaled for the all the temporal sub-layers of the video data, and means for signaling a number of instances of HRD parameters according to the number temporal sub-layers of the video data and the value of the flag.

In one example, a method of decoding video data comprises parsing a flag indicating whether respective instances of HRD parameters are signaled for each temporal sub-layers of video data or whether a single instance of HRD parameters is signaled for the all the temporal sub-layers of the video data, and parsing a number of instances of HRD parameters according to the number temporal sub-layers of the video data and the value of the flag.

In one example, a device comprises one or more processors configured to parse a flag indicating whether respective instances of HRD parameters are signaled for each temporal sub-layers of video data or whether a single instance of HRD parameters is signaled for the all the temporal sub-layers of the video data, and parse a number of instances of HRD parameters according to the number temporal sub-layers of the video data and the value of the flag.

In one example, a non-transitory computer-readable storage medium comprises instructions stored thereon that, when executed, cause one or more processors of a device to parse a flag indicating whether respective instances of HRD parameters are signaled for each temporal sub-layers of video data or whether a single instance of HRD parameters is signaled for the all the temporal sub-layers of the video data, and parse a number of instances of HRD parameters according to the number temporal sub-layers of the video data and the value of the flag.

In one example, an apparatus comprises means for parsing a flag indicating whether respective instances of HRD parameters are signaled for each temporal sub-layers of video data or whether a single instance of HRD parameters is signaled for the all the temporal sub-layers of the video data, and means for parsing a number of instances of HRD parameters according to the number temporal sub-layers of the video data and the value of the flag.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In iTU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may by halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-N1001, CTUs are partitioned according a quadtree plus multi-type tree (QTMT or QT+MTT) structure. The QTMT in JVET-N1001 is similar to the QTBT in JEM. However, in JVET-N1001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

As described above, each video frame or picture may divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

Figure 2:
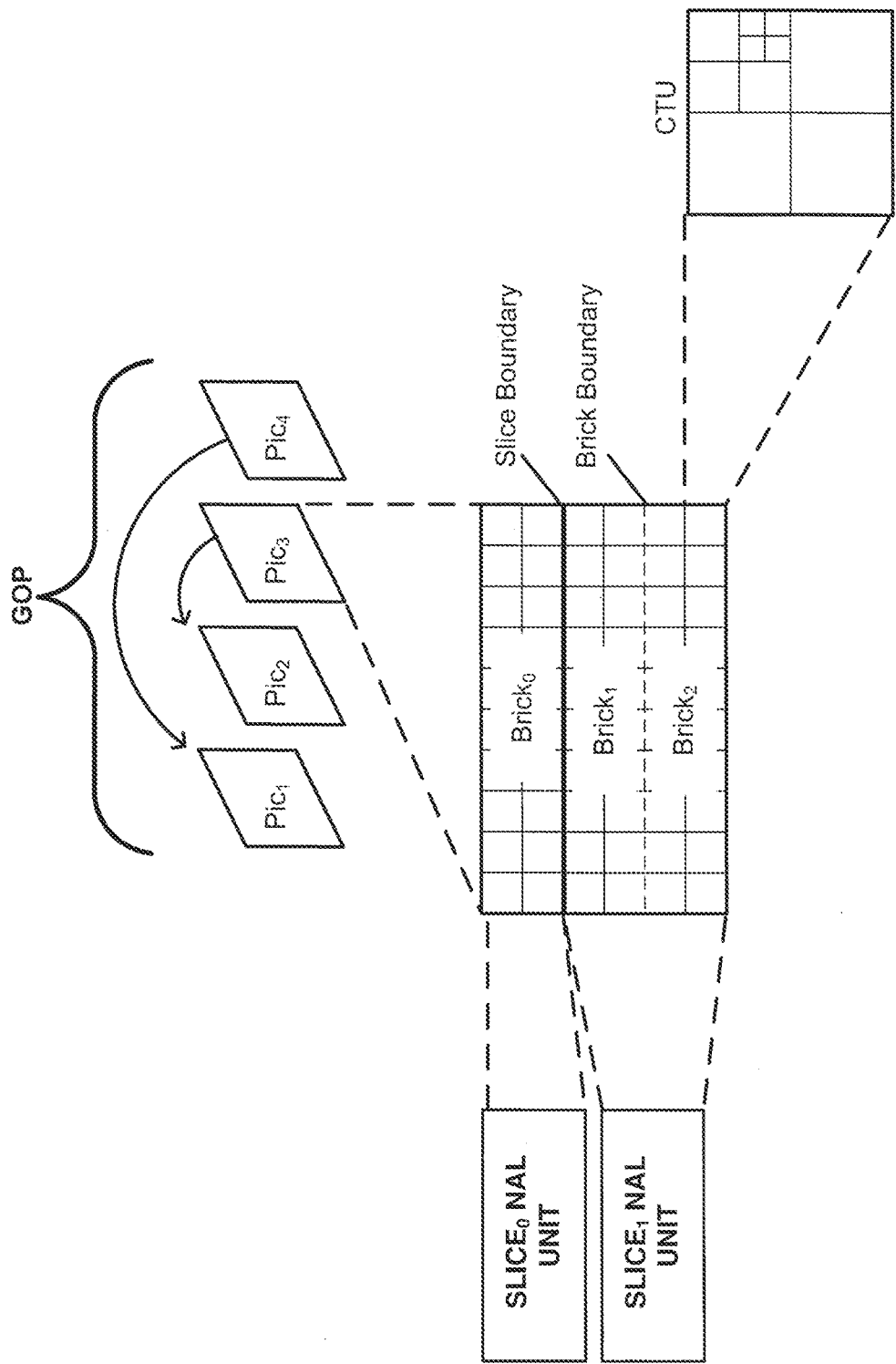
FIG. 2 is a conceptual diagram illustrating coded video data and corresponding data structures according to one or more techniques of this this disclosure.

With respect to JVET-N1001, slices are required to consist of an integer number of bricks instead of only being required to consist of an integer number of CTUs. In JVET-N1001, a brick is a rectangular region of CTU rows within a particular tile in a picture. Further, in JVET-N1001, a tile may be partitioned into multiple bricks, each of which consisting of one or more CTU rows within the tile. A tile that is not partitioned into multiple bricks is also referred to as a brick. However, a brick that is a true subset of a tile is not referred to as a tile. As such, a slice including a set of CTUs which do not form a rectangular region of a picture may or may not be supported in some video coding techniques. Further, it should be noted that in some cases, a slice may be required to consist of an integer number of complete tiles and in this case is referred to as a tile group. The techniques described herein may applicable to bricks, slices, tiles, and/or tile groups. FIG. 2 is a conceptual diagram illustrating an example of a group of pictures including slices. In the example illustrated in FIG. 2, $Pic_3$ is illustrated as including two slices (i.e., $Slice_0$ and $Slice_1$). In the example illustrated in FIG. 2, $Slice_0$ includes one brick, i.e., $Brick_0$ and $Slice_1$ includes two bricks, i.e., $Brick_1$ and $Brick_2$. It should be noted that in some cases, $Slice_0$ and $Slice_1$ may meet the requirements of and be classified as tiles and/or tile groups.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded picture stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, $Pic_3$ is illustrated as referencing $Pic_2$. Similarly, $Pic_1$, is illustrated as referencing $Pic_1$. With respect to FIG. 2 assuming the picture number corresponds to the decoding order the DPB would be populated as follows: after decoding $Pic_1$, the DPB would include $\{Pic_1\}$; at the onset of decoding $Pic_2$, the DPB would include $\{Pic_1\}$; after decoding $Pic_2$, the DPB would include $\{Pic_1, Pic_2\}$; at the onset of decoding $Pic_3$, the DPB would include $\{Pic_1 \ Pic_2\}$. $Pic_3$ would then be decoded with reference to $Pic_2$ and after decoding $Pic_3$, the DPB would include $\{Pic_1, Pic_2, Pic_3\}$. At the onset of decoding $Pic_4$, pictures $Pic_2$ and $Pic_3$ would be marked for removal from the DPB, as they are not needed for decoding $Pic_4$ (or any subsequent pictures, not shown) and assuming $Pic_2$ and $Pic_3$ have been output, the DPB would be updated to include $(Pic_1)$. $Pic_4$ would then be decoded with referencing $Pic_1$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-N1001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

With respect to the equations used herein, the following arithmetic operators may be used:
+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

Further, the following mathematical functions may be used:
$Log_2(x)$ the base-2 logarithm of x;

$$Min(x, y) = \begin{cases} x; & x <= y \\ y; & x > y \end{cases};$$

$$Max(x, y) = \begin{cases} x; & x >= y \\ y; & x < y \end{cases}$$

Ceil(x) the smallest integer greater than or equal to x.

With respect to the example syntax used herein, the following definitions of logical operators may be applied:
x && y Boolean logical "and" of x and y
x||y Boolean logical "or" of x and y
! Boolean logical "not"
x?y:z If x is TRUE or not equal to 0, evaluates to the value of y; otherwise, evaluates to the value of z.

Further, the following relational operators may be applied:
\> Greater than
\>= Greater than or equal to
< Less than
<= Less than or equal to
= Equal to
!= Not equal to Further, it should be noted that in the syntax descriptors used herein, the following descriptors may be applied:
b(8): byte having any pattern of bit string (8 bits). The parsing process for this descriptor is specified by the return value of the function read_bits(8).
f(n): fixed-pattern bit string using n bits written (from left to right) with the left bit first. The parsing process for this descriptor is specified by the return value of the function read_bits(n).
se(v): signed integer 0-th order Exp-Golomb-coded syntax element with the left bit first.
tb(v): truncated binary using up to maxVal bits with maxVal defined in the semantics of the syntax element.
tu(v): truncated unary using up to maxVal bits with maxVal defined in the semantics of the syntax element.
u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.
ue(v): unsigned integer 0-th order Exp-Golomb-coded syntax element with the left bit first.

As described above, video content includes video sequences comprised of a series of frames (or pictures) and each video frame or picture may be divided into one or more regions. A coded video sequence (CVS) may be encapsulated (or structured) as a sequence of access units, where each access unit includes video data structured as network abstraction layer (NAL) units. A bitstream may be described as including a sequence of NAL units forming one or more CVSs. It should be noted that multi-layer extensions enable a video presentation to include a base layer and one or more additional enhancement layers. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. Each NAL unit may include an identifier indicating a layer of video data the NAL unit is associated with. It should be noted that sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation). Layers may also be coded independent of each other. In this case, there may not be an inter-layer prediction between two layers.

Referring to the example illustrated in FIG. 2, each slice of video data included in $Pic_3$ (i.e., $Slice_0$ and $Slice_1$) is illustrated as being encapsulated in a NAL unit. In JVET-N1001, each of a video sequence, a GOP, a picture, a slice, and CTU may be associated with metadata that describes video coding properties. JVET-N1001 defines parameters sets that may be used to describe video data and/or video coding properties. In particular, JVET-N1001 includes the following five types of parameter sets: decoding parameter set (DPS), video parameter set (VPS), sequence parameter set (SPS), picture parameter set (PPS), and adaption parameter set (APS). With respect to the SPS, JVET-N1001 includes the following definition:

sequence parameter set (SPS): A syntax structure containing syntax elements that apply to zero or more entire CVSs as determined by the content of a syntax element found in the PPS referred to by a syntax element found in each slice header.

In JVET-N1001, parameter sets may be encapsulated as a special type of NAL unit or may be signaled as a message. NAL units including coded video data (e.g., a slice) may be referred to as VCL (Video Coding Layer) NAL units and NAL units including metadata (e.g., parameter sets) may be referred to as non-VCL NAL units. Further, JVET-N1001 enables supplemental enhancement information (SEI) messages to be signaled. In JVET-N1001, SEI messages assist in processes related to decoding, display or other purposes, however, SEI messages may not be required for constructing the luma or chroma samples by the decoding process. In JVET-N1001, SEI messages may be signaled in a bitstream using non-VCL NAL units. Further, SEI messages may be conveyed by some means other than by being present in the bitstream (i.e., signaled out-of-band).

An access unit may be called a layer access unit. As described above, multi-layer extensions enable a video presentation to include a base layer and one or more additional enhancement layers. It should be noted that in ITU-T H.265 a temporal true subset of a scalable layer is not referred to as a layer but referred to as a sub-layer or temporal sub-layer. That is, ITU-T H.265 provides the following definitions with respect to sub-layers: sub-layer: A temporal scalable layer of a temporal scalable bitstream, consisting of VCL NAL units with a particular value of the TemporalId variable and the associated non-VCL NAL units.

The term sub-layer and temporal sub-layer may be used interchangeably.

Figure 3:
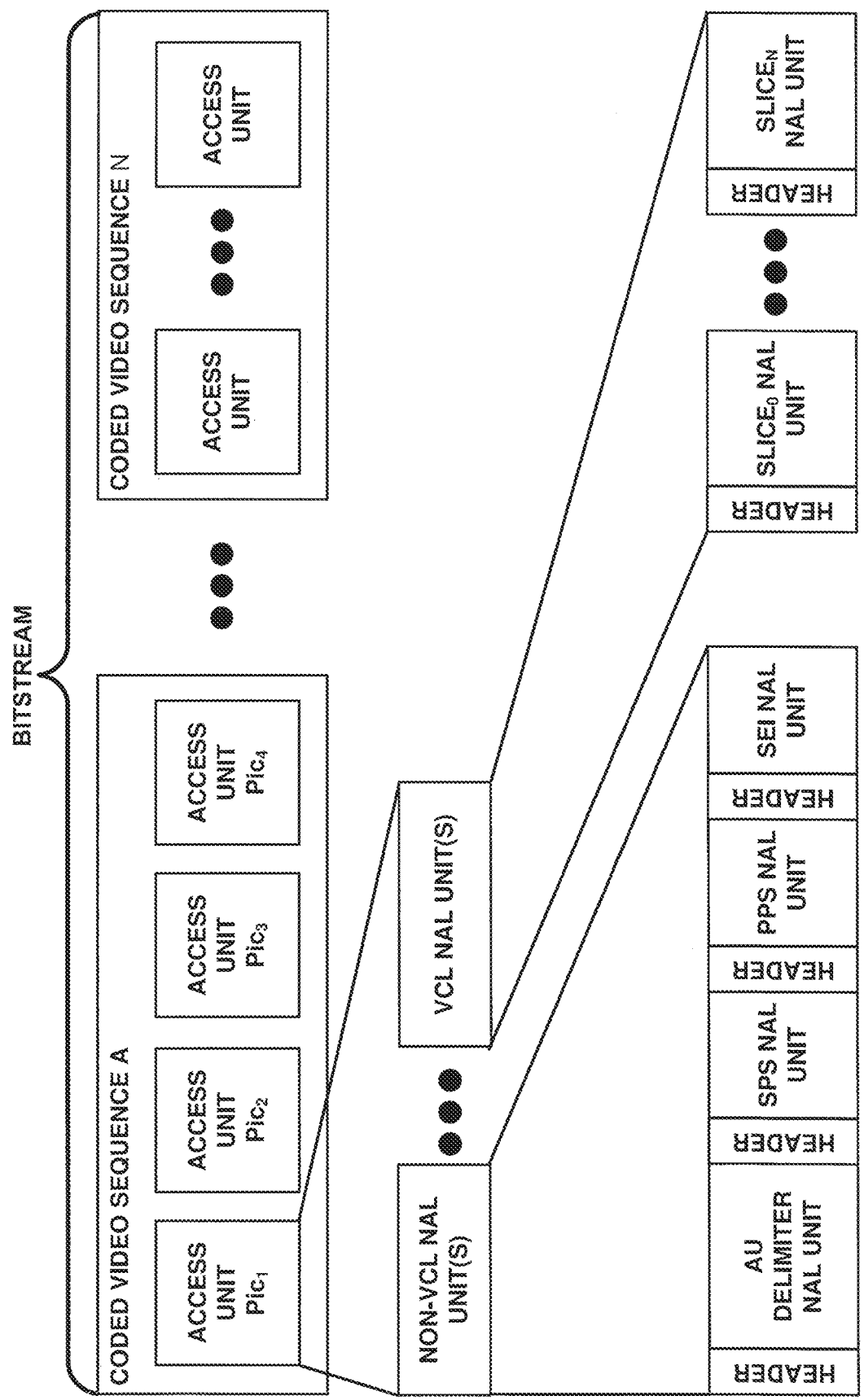
FIG. 3 is a conceptual diagram illustrating a data structure encapsulating coded video data and corresponding metadata according to one or more techniques of this this disclosure.

FIG. 3 illustrates an example of a bitstream including multiple CVSs, where a CVS is represented by NAL units included in a respective access unit. In the example illustrated in FIG. 3, non-VCL NAL units include respective parameter set NAL units (i.e., Sequence Parameter Sets (SPS), and Picture Parameter Set (PPS) NAL units), an SEI message NAL unit, and an access unit delimiter NAL unit. It should be noted that in FIG. 3, HEADER is a NAL unit header.

JVET-N1001 defines NAL unit header semantics that specify the type of Raw Byte Sequence Payload (RBSP) data structure included in the NAL unit. Table 1 illustrates the syntax of the NAL unit header provided in JVET-N1001.

TABLE 1

|  | Descriptor |
| --- | --- |
| nal_unit_header( ) { |  |
|   zero_tid_required_flag | u(1) |
|   nuh_temporal_id_plus1 | u(3) |
|   nal_unit_type_lsb | u(4) |
|   nuh_layer_id | u(7) |
|   nuh_reserved_zero_bit | u(1) |
| } |  |

JVET-N1001 provides the following definitions for the respective syntax elements illustrated in Table 1.

zero_tid_required_flag equal to 0 specifies that zero_tid_required_flag does not impose any additional constraints on the value of nuh_temporal_id_plus1.

nuh_temporal_id_plus1 minus 1 specifies a temporal identifier for the NAL unit. The value of nuh_temporal_id_plus1 shall not be equal to 0. When zero_tid_required_flag is equal to 1, the value of nuh_temporal_id_plus1 shall be equal to 1.

The variable TemporalId is derived as follows:

TemporalId=nuh_temporal_id_plus1−1

NOTE—NAL unit types in the range of 16 to 31, inclusive, have zero_tid_required_flag equal to 1, and consequently have TemporalId equal to 0.

The value of TemporalId shall be the same for all VCL NAL units of a layer access unit. The value of TemporalId of a coded picture or a layer access unit is the value of the TemporalId of the VCL NAL units of the coded picture or the layer access unit.

The value of TemporalId for non-VCL NAL units is constrained as follows:
If NalUnitType is equal to SPS_NUT, TemporalId is equal to 0 and the TemporalId of the layer access unit containing the NAL unit shall be equal to 0.
Otherwise, if NalUnitType is equal to APS_NUT, TemporalId shall be equal to that of the layer access unit containing the NAL unit.
Otherwise, when NalUnitType is not equal to EOS_NUT and not equal to EOB_NUT, TemporalId shall be greater than or equal to the TemporalId of the layer access unit containing the NAL unit.
NOTE—When the NAL unit is a non-VCL NAL unit, the value of TemporalId is equal to the minimum value of the TemporalId values of all layer access units to which the non-VCL NAL unit applies. When NalUnitType is equal to PPS NUT, TemporalId may be greater than or equal to the TemporalId of the containing layer access unit, as all picture parameter sets (PPSs) may be included in the beginning of a bitstream, wherein the first coded picture has TemporalId equal to 0. When NalUnitType is equal to PREFIX_SEI_NUT or SUFFIX_SEI_NUT, TemporalId may be greater than or equal to the TemporalId of the containing layer access unit, as an SEI NAL unit may contain information that applies to a bitstream subset that includes layer access units for which the TemporalId values are greater than the TemporalId of the layer access unit containing the SEI NAL unit.

nuh_layer_id specifies the identifier of the layer to which a VCL NAL unit belongs or the identifier of a layer to which a non-VCL NAL unit applies. The value of nuh_layer_id shall be in the range of 0 to 126, inclusive. The value of 127 may be specified in the future by ITU-T|ISO/IEC. For purposes other than determining the amount of data in the decoding units of the bitstream, decoders shall ignore all data that follow the value 127 for nuh_layer_id in a NAL unit.

NOTE—The value of 127 for nuh_layer_id may be used to indicate an extended layer identifier in a future extension of this Specification.

The value of nuh_layer_id shall be the same for all VCL NAL units of a coded picture. The value of nuh_layer_id of a coded picture is the value of the nuh_layer_id of the VCL NAL units of the coded picture.

nuh_reserved_zero_bit shall be equal to '0'. The value 1 of nuh_reserved_zero_bit may be specified in the future by ITU-T|ISO/IEC. Decoders shall ignore (i.e. remove from the bitstream and discard) NAL units with nuh_reserved_zero_bit equal to 'T'.

With respect to the syntax element nal_unit_type_lsb, JVET-N1001 provides the following: nal_unit_type_lsb specifies the least significant bits for the NAL unit type.

The variable NalUnitType, which specifies the NAL unit type, i.e., the type of RBSP data structure contained in the NAL unit as specified in Table 2 is derived as follows:

NalUnitType=(zero_tid_required_flag<<4)+nal_unit_type_lsb

NAL units that have NalUnitType in the range of UNSPEC28 . . . UNSPEC31, inclusive, for which semantics are not specified, shall not affect the decoding process specified in this Specification.

NOTE—NAL unit types in the range of UNSPEC28 . . . UNSPEC31 may be used as determined by the application. No decoding process for these values of NalUnitType is specified in this Specification. Since different applications might use these NAL unit types for different purposes, particular care must be exercised in the design of encoders that generate NAL units with these NalUnitType values, and in the design of decoders that interpret the content of NAL units with these NalUnitType values. This Specification does not define any management for these values. These NalUnitType values might only be suitable for use in contexts in which "collisions" of usage (i.e., different definitions of the meaning of the NAL unit content for the same NalUnitType value) are unimportant, or not possible, or are managed— e.g., defined or managed in the controlling application or transport specification, or by controlling the environment in which bitstreams are distributed.

For purposes other than determining the amount of data in the decoding units of the bitstream, decoders shall ignore (remove from the bitstream and discard) the contents of all NAL units that use reserved values of NalUnitType.

NOTE—This requirement allows future definition of compatible extensions to this Specification.

instantaneous decoder refresh (IDR) picture. ITU-T H.265 describes the concept of a leading picture, which is a picture that precedes the associated IRAP picture in output order. ITU-T H.265 further describes the concept of a trailing picture which is a non-IRAP picture that follows the associated IRAP picture in output order. Trailing pictures associated with an IRAP picture also follow the IRAP picture in decoding order. For IDR pictures, there are no trailing pictures that require reference to a picture decoded prior to the IDR picture. ITU-T H.265 provides where a CRA picture may have leading pictures that follow the CRA picture in decoding order and contain inter picture prediction references to pictures decoded prior to the CRA picture. Thus, when the CRA picture is used as a random access point these leading pictures may not be decodable and are identified as

TABLE 2

| NalUnitType | Name of NalUnitType | Content of NAL unit and RBSP syntax structure | NAL unit type class |
|---|---|---|---|
| 0 | PPS_NUT | Picture parameter set pic_parameter_set_rbsp( ) | non-VCL |
| 1 | AUD_NUT | Access unit delimiter access_unit_delimiter_rbsp( ) | non-VCL |
| 2 | PREFIX_SEI_NUT | Supplemental enhancement information | non-VCL |
| 3 | SUFFIX_SEI_NUT | sei_rbsp( ) | |
| 4 | APS_NUT | Adaptation parameter set adaptation_parameter_set_rbsp( ) | non-VCL |
| 65..7 | RSV_NVCL65..RSV_NVCL7 | Reserved | non-VCL |
| 8 | TRAIL_NUT | Coded slice of a non-STSA trailing picture slice_layer_rbsp( ) | VCL |
| 9 | STSA_NUT | Coded slice of an STSA picture slice_layer_rbsp( ) | VCL |
| 10 | RADL_NUT | Coded slice of a RADL picture slice_layer_rbsp( ) | VCL |
| 11 | RASL_NUT | Coded slice of a RASL picture slice_layer_rbsp( ) | VCL |
| 12..15 | RSV_VCL_12..RSV_VCL_15 | Reserved non-IRAP VCL NAL unit types | VCL |
| 16 | DPS_NUT | Decoding parameter set decoding_parameter_set_ rbsp( ) | non-VCL |
| 17 | SPS_NUT | Sequence parameter set seq_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20 | VPS_NUT | Video parameter set video_parameter_set_rbsp( ) | non-VCL |
| 21..23 | RSV_NVCL21..RSV_NVCL23 | Reserved | non-VCL |
| 24 | IDR_W_RADL | Coded slice of an IDR picture slice_layer_rbsp( ) | VCL |
| 25 | IDR_N_LP | | |
| 26 | CRA_NUT | Coded slice of a CRA picture slice_layer_rbsp( ) | VCL |
| 27 | GRA_NUT | Coded slice of a gradual random access picture slice_layer_rbsp( ) | VCL |
| 28..31 | UNSPEC28..UNSPEC31 | Unspecified | non-VCL |

NOTE—A clean random access (CRA) picture may have associated RASL or RADL pictures present in the bitstream.

NOTE—An instantaneous decoding refresh (IDR) picture having NalUnitType equal to IDR_N_LP does not have associated leading pictures present in the bitstream. An IDR picture having NalUnitType equal to IDR_W_RADL does not have associated RASL pictures present in the bitstream, but may have associated RADL pictures in the bitstream.

It should be noted that generally, for example with respect to ITU-T H.265, an IRAP a picture is a picture that does not refer to any pictures other than itself for inter prediction in its decoding process. Typically, the first picture in the bitstream in decoding order must be an IRAP picture. In ITU-T H.265, an IRAP picture may be a broken link access (BLA) picture, a clean random access (CRA) picture or an random access skipped leading (RASL) pictures. BLA pictures may also be followed by RASL pictures. These RASL pictures are always discarded for BLA pictures and discarded for CRA pictures when they are non-decodable, i.e., when a decoder that starts its decoding process at a CRA point. The other type of picture that can follow an IRAP picture in decoding order and precede it in output order is the random access decodable leading (RADL) picture, which cannot contain references to any pictures that precede the IRAP picture in decoding order.

As described above, in JVET-N1001, non-VCL NAL units include respective parameter set NAL units. Table 3 illustrates the sequence parameter set syntax provided in JVET-N1001.

TABLE 3

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gra_enabled_flag | u(1) |
|   sps_seq_parameter_set_id | ue(v) |
|   chroma_format_idc | ue(v) |
|   if( chroma_format_idc == 3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for( i = ( sps_sub_layer_ordering_info_present_flag ? 0 : sps_max_sub_layers_minus1 ); | |
|     i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   long_term_ref_pics_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) | |
|       ref_pic_list_struct( i, j ) | |
|   } | |
|   qtbtt_dual_tree_intra_flag | u(1) |
|   log2_ctu_size_minus2 | ue(v) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slices != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
|   sps_sao_enabled_flag | u(1) |
|   sps_alf_enabled_flag | u(1) |
|   sps_pcm_enabled_flag | u(1) |
|   if( sps_pcm_enabled_flag ) { | |
|     pcm_sample_bit_depth_luma_minus1 | u(4) |
|     pcm_sample_bit_depth_chroma_minus1 | u(4) |
|     log2_min_pcm_luma_coding_block_size_minus3 | ue(v) |
|     log2_diff_max_min_pcm_luma_coding_block_size | ue(v) |
|     pcm_loop_filter_disabled_flag | u(1) |
|   } | |

TABLE 3-continued

| | Descriptor |
|---|---|
| if( ( CtbSizeY / MinCbSizeY + 1 )  <=  ( pic_width_in_luma_samples / MinCbSizeY − 1 ) ) { | |
|   sps_ref_wraparound_enabled_flag | u(1) |
|   if( sps_ref_wraparound_enabled_flag ) | |
|     sps_ref_wraparound_offset_minus1 | ue(v) |
| } | |
| sps_temporal_mvp_enabled_flag | |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| sps_smvd_enabled_flag | u(1) |
| sps_affine_amvr_enabled_flag | u(1) |
| sps_dmvr_enabled_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| sps_cclm_enabled_flag | u(1) |
| if( sps_cclm_enabled_flag  &&  chroma_format_idc  = =  1 ) | |
|   sps_cclm_colocated_chroma_flag | u(1) |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_sbt_enabled_flag | u(1) |
| if( sps_sbt_enabled_flag ) | |
|   sps_sbt_max_size_64_flag | u(1) |
| sps_affine_enabled_flag | u(1) |
| if( sps_affine_enabled_flag) | |
|   sps_affine_type_flag | u(1) |
| sps_bcw_enabled_flag | u(1) |
| sps_ibc_enabled_flag | u(1) |
| sps_ciip_enabled_flag | u(1) |
| if( sps_mmvd_enabled_flag ) | |
|   sps_fpel_mmvd_enabled_flag | u(1) |
| sps_triangle_enabled_flag | u(1) |
| sps_lmcs_enabled_flag | u(1) |
| sps_ladf_enabled_flag | u(1) |
| if ( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| timing_info_present_flag | u(1) |
| if( timing_info_present_flag ) { | |
|   num_units_in_tick | u(32) |
|   time_scale | u(32) |
|   hrd_parameters_present_flag | u(1) |
|   if( hrd_parameters_present_flag ) | |
|     hrd_parameters( sps_max_sub_layers_minus1 ) | |
| } | |
| vui_parameters_present_flag | u(1) |
| if( vui_parameters_present_flag ) | |
|   vui_parameters( ) | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

With respect to Table 3, JVET-N1001 provides the following semantics:

sps_decoding_parameter_set_id, when greater than 0, specifies the value of dps_decoding_parameter_set_id for the DPS referred to by the SPS. When sps_decoding_parameter_set_id is equal to 0, the SPS does not refer to a DPS and no DPS is active when decoding each CVS referring to the SPS.

sps_video_parameter_set_id, when greater than 0, specifies the value of vps_video_parameter_set_id for the VPS referred to by the SPS. When sps_video_parameter_set_id is equal to 0, the SPS does not refer to a VPS and no VPS is active when decoding each CVS referring to the SPS.

sps_max_sub_layers_minus1 plus 1 specifies the maximum number of temporal sub-layers that may be present in each CVS referring to the SPS. The value of sps_max_sub_layers_minus1 shall be in the range of 0 to 6, inclusive.

sps_reserved_zero_5bits shall be equal to 0 in bitstreams conforming to this version of this Specification. Other values for sps_reserved_zero_5bits are reserved for future use by ITU-T|ISO/IEC.

gra_enabled_flag equal to 1 specifies that GRA pictures may be present in CVSs referring to the SPS. gra_enabled_flag equal to 0 specifies that GRA pictures are not present in CVSs referring to the SPS.

sps_seq_parameter_set_id provides an identifier for the SPS for reference by other syntax elements. The value of sps_seq_parameter_set_id shall be in the range of 0 to 15, inclusive.

chroma_format_idc specifies the chroma sampling relative to the luma sampling as specified. The value of chroma_format_idc shall be in the range of 0 to 3, inclusive.

separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

NOTE—There is no dependency in decoding processes between the colour planes having different colour_plane_id values. For example, the decoding process of a monochrome picture with one value of colour_plane_id does not use any data from monochrome pictures having different values of colour plane id for inter prediction.

Depending on the value of separate_colour_plane_flag, the value of the variable ChromaArrayType is assigned as follows:
  If separate_colour_plane_flag is equal to 0, ChromaArrayType is set equal to chroma_format_idc.
  Otherwise (separate_colour_plane_flag is equal to 1), ChromaArrayType is set equal to 0.

pic_width_in_luma_samples specifies the width of each decoded picture in units of luma samples. pic_width_in_luma_samples shall not be equal to 0 and shall be an integer multiple of MinCbSizcY.

pic_height_in_luma_samples specifies the height of each decoded picture in units of luma samples. pic_height_in_luma_samples shall not be equal to 0 and shall be an integer multiple of MinCbSizeY.

conformance_window_flag equal to 1 indicates that the conformance cropping window offset parameters follow next in the SPS. conformance_window_flag equal to 0 indicates that the conformance cropping window offset parameters are not present.

conf_win_left_offset, conf_win_right_offset, conf_win_top_offset, and conf_win_bottom_offset specify the samples of the pictures in the CVS that are output from the decoding process, in terms of a rectangular region specified in picture coordinates for output. When conformance_window_flag is equal to 0, the values of conf_win_left_offset, conf_win_right_offset, conf_win_top_offset, and conf_win_bottom_offset are inferred to be equal to 0.

The conformance cropping window contains the luma samples with horizontal picture coordinates from SubWidthC*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive.

The value of SubWidthC*(conf_win_left_offset+conf_win_right_offset) shall be less than pic_width_in_luma_samples, and the value of SubHeightC*(conf_win_top_offset+conf_win_bottom_offset) shall be less than pic_height_in_luma_samples.

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output. All internal decoding processes are applied to the uncropped picture size.

bit_depth_luma_minus8 specifies the bit depth of the samples of the luma array $BitDepth_Y$ and the value of the luma quantization parameter range offset $QpBdOffset_Y$ as follows:

$$BitDepth_Y = 8 + bit\_depth\_luma\_minus8$$

$$QpBdOffset_Y = 6 * bit\_depth\_luma\_minus8$$

bit_depth_luma_minus8 shall be in the range of 0 to 8, inclusive.

bit_depth_chroma_minus8 specifies the bit depth of the samples of the chroma arrays $BitDepth_C$ and the value of the chroma quantization parameter range offset $QpBdOffset_C$ as follows:

$$BitDepth_C = 8 + bit\_depth\_chroma\_minus8$$

$$QpBdOffset_C = 6 * bit\_depth\_chroma\_minus8$$

bit_depth_chroma_minus8 shall be in the range of 0 to 8, inclusive.

log 2_max_pic_order_cnt_lsb_minus4 specifies the value of the variable MaxPicOrderCntLsb that is used in the decoding process for picture order count as follows:

$$MaxPicOrderCntLsb = 2^{(log2\_max\_pic\_order\_cnt\_lsb\_minus4+4)}$$

The value of log 2_max_pic_order_cnt_lsb_minus4 shall be in the range of 0 to 12, inclusive.

sps_sub_layer_ordering_info_present_flag equal to 1 specifies that sps_max_dec_pic_buffering_minus1[i], sps_max_num_reorder_pics[i], and sps_max_latency_increase_plus1[i] are present for sps_max_sub_layers_minus1+1 sub-layers. sps_sub_layer_ordering_info_present_flag equal to 0 specifies that the values of sps_max_dec_pic_buffering_minus[sps_max_sub_layers_minus1], sps_max_num_reorder_pics[sps_max_sub_layers_minus1], and sps_max_latency_increase_plus1[sps_max_sub_layers_minus1] apply to all sub-layers.

sps_max_dec_pic_buffering_minus1[i] plus 1 specifies the maximum required size of the decoded picture buffer for the CVS in units of picture storage buffers when HighestTid is equal to i. The value of sps_max_dec_pic_buffering_minus1[i] shall be in the range of 0 to MaxDpbSize−1, inclusive, where MaxDpbSize is as specified somewhere else. When i is greater than 0, sps_max_dec_pic_buffering_minus1[i] shall be greater than or equal to sps_max_dec_pic_buffering_minus1[i−1]. When sps_max_dec_pic_buffering_minus1[i] is not present for i in the range of 0 to sps_max_sub_layers_minus1−1, inclusive, due to sps_sub_layer_ordering_info_present_flag being equal to 0, it is inferred to be equal to sps_max_dec_pic_buffering_minus1 [sps_max_sub_layers_minus1].

sps_max_num_reorder_pics[i] indicates the maximum allowed number of pictures that can precede any picture in the CVS in decoding order and follow that picture in output order when HighestTid is equal to i. The value of sps_max_num_reorder_pics[i] shall be in the range of 0 to sps_max_dec_pic_buffering_minus1[i], inclusive. When i is greater than 0, sps_max_num_reorder_pics[i] shall be greater than or equal to sps_max_num_reorder_pics[i−1]. When sps_max_num_reorder_pics[i] is not present for i in the range of 0 to sps_max_sub_layers_minus1−1, inclusive, due to sps_sub_layer_ordering_info_present_flag being equal to 0, it is inferred to be equal to sps_max_num_reorder_pics[sps_max_sub_layers_minus1].

sps_max_latency_increase_plus1[i] not equal to 0 is used to compute the value of SpsMaxLatencyPictures[i], which specifies the maximum number of pictures that can precede any picture in the CVS in output order and follow that picture in decoding order when HighestTid is equal to i.

When sps_max_latency_increase_plus1[i] is not equal to 0, the value of SpsMaxLatencyPictures[i] is specified as follows:

SpsMaxLatencyPictures[i]=sps_max_num_reorder_pics[i]+sps_max_latency_increase_plus1[i]−1

When sps_max_latency_increase_plus1[i] is equal to 0, no corresponding limit is expressed.

The value of sps_max_latency_increase_plus1[i] shall be in the range of 0 to $2^{32}$−2, inclusive. When sps_max_latency_increase_plus1[i] is not present for i in the range of 0 to sps_max_sub_layers_minus1−1, inclusive, due to sps_sub_layer_ordering_info_present_flag being equal to 0, it is inferred to be equal to sps_max_latency_increase_plus1[sps_max_sub_layers_minus1].

long_term_ref_pics_flag equal to 0 specifies that no LTRP is used for inter prediction of any coded picture in the CVS. long_term_ref_pics_flag equal to 1 specifies that LTRPs may be used for inter prediction of one or more coded pictures in the CVS.

sps_idr_rpl_present_flag equal to 1 specifies that reference picture list syntax elements are present in slice headers of IDR pictures. sps_idr_rpl_present_flag equal to 0 specifies that reference picture list syntax elements are not present in slice headers of IDR pictures.

rpl1_same_as_rpl0_flag equal to 1 specifies that the syntax structures num_ref_pic_lists_in_sps[1] and ref_pic_list_struct(1, rplsIdx) are not present and the following applies:
 The value of num_ref_pic_lists_in_sps[1] is inferred to be equal to the value of num_ref_pic_lists_in_sps[0].
 The value of each of syntax elements in ref_pic_list_struct(1, rplsIdx) is inferred to be equal to the value of corresponding syntax element in ref_pic_list_struct(0, rplsIdx) for rplsIdx ranging from 0 to num_ref_pic_lists_in_sps[0]−1.

num_ref_pic_lists_in_sps[i] specifies the number of the ref_pic_list_struct(listIdx, rplsIdx) syntax structures with listIdx equal to i included in the SPS. The value of num_ref_pic_lists_in_sps[i] shall be in the range of 0 to 64, inclusive.

NOTE—For each value of ListIdx (equal to 0 or 1), a decoder should allocate memory for a total number of num_ref_pic_lists_in_sps[i]+1 ref_pic_list_struct(listIdx, rplsIdx) syntax structures since there may be one ref_pic_list_struct(listIdx, rplsIdx) syntax structure directly signalled in the slice headers of a current picture.

qtbtt_dual_tree_intra_flag equal to 1 specifies that for I slices, each CTU is split into coding units with 64×64 luma samples using an implicit quadtree split and that these coding units are the root of two separate coding_tree syntax structure for luma and chroma.

log 2_ctu_size_minus2 plus 2 specifies the luma coding tree block size of each CTU.

log 2_min_luma_coding_block_size_minus2 plus 2 specifies the minimum luma coding block size.

The variables Ctb Log 2SizeY, CtbSizeY, MinCb Log 2SizeY, MinCbSizeY, MinTb Log 2SizeY, MaxTb Log 2SizeY, MinTbSizeY, MaxTbSizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightinSamplesC are derived as follows:

Ctb Log 2SizeY=log 2_ctu_size_minus2+2

CtbSizeY=1<<Ctb Log 2SizeY

MinCb Log 2SizeY=log 2_min_luma_coding_block_size_minus2+2

MinCbSizeY=1<<MinCb Log 2SizeY

MinTb Log 2SizeY=2

MaxTb Log 2SizeY=6

MinTbSizeY=1<<MinTb Log 2SizeY

MaxTbSizeY=1<<MaxTb Log 2SizeY

PicWidthInCtbsY=Ceil(pic_width_in_luma_samples+CtbSizeY)

PicHeightInCtbsY=Ceil(pic_height_in_luma_samples+CtbSizeY)

PicSizeInCtbsY=PicWidthInCtbsY*PicHeightInCtbsY

PicWidthInMinCbsY=pic_width_in_luma_samples/MinCbSizeY

PicHeightInMinCbsY=pic_height_in_luma_samples/MinCbSizeY

PicSizeInMinCbsY=PicWidthInMinCbsY*PicHeightInMinCbsY

PicSizeInSamplesY=pic_width_in_luma_samples*pic_height_in_luma_samples

PicWidthInSamplesC=pic_width_in_luma_samples/SubWidthC

PicHeightInSamplesC=pic_height_in_luma_samples/SubHeightC

The variables CtbWidthC and CtbHeightC, which specify the width and height, respectively, of the array for each chroma CTB, are derived as follows:
 If chroma_format_idc is equal to 0 (monochrome) or separate_colour_plane_flag is equal to 1, CtbWidthC and CtbHeightC are both equal to 0.
 Otherwise, CtbWidthC and CtbHeightC are derived as follows:

CtbWidthC=CtbSizeY/SubWidthC

CtbHeightC=CtbSizeY/SubHeightC

For log 2BlockWidth ranging from 0 to 4 and for log 2BlockHeight ranging from 0 to 4, inclusive, the up-right diagonal scan order array initialization process as specified is invoked with 1<<log 2BlockWidth and 1<<log 2BlockHeight as inputs, and the output is assigned to DiagScanOrder[log 2BlockWidth][log 2BlockHeight].

partition_constraints_override_enabled_flag equal to 1 specifies the presence of partition_constraints_override_flag in the slice headers for slices referring to the SPS. partition_constraints_override_enabled_flag equal to 0 specifies the absence of partition-constraints override flag in the slice headers for slices referring to the SPS.

sps_log 2_diff_min_qt_min_cb_intra_slice_luma specifics the default difference between the base 2 logarithm of the minimum size in luma samples of a luma leaf block resulting from quadtree splitting of a CTU and the base 2 logarithm of the minimum coding block size in luma samples for luma CUs in slices with slice_type equal to 2 (I) referring to the SPS. When partition_constraints_override_flag is equal to 1, the default difference can be overridden by slice_log 2_diff_min_qt_min_cb_luma present in the slice header of the slices referring to the SPS. The value of sps_log 2_diff_min_qt_min_cb_intra_slice_luma shall be in the range of 0 to Ctb Log 2SizeY−MinCb Log 2SizeY, inclusive. The base 2 logarithm of the minimum size in luma samples of a luma leaf block resulting from quadtree splitting of a CTU is derived as follows:

MinQt Log 2SizeIntraY=sps_log 2_diff_min_qt_min_cb_intra_slice_luma+MinCb Log 2SizeY sps_log 2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice_type equal to 0 (B) or 1 (P) referring to the SPS. When partition_constraints_override_flag is equal to 1, the default difference can be overridden by slice_log 2_diff_min_qt_min_cb_luma present in the slice header of the slices referring to the SPS. The value of sps_log 2_diff_min_qt_min_cb_inter_slice shall be in the range of 0 to Ctb Log 2SizeY−MinCb Log 2SizeY, inclusive. The base 2 logarithm of the minimum size in luma samples of a luma leaf block resulting from quadtree splitting of a CTU is derived as follows:

MinQt Log 2SizeInterY=sps_log 2_diff_min_qt_min_cb_inter_slice+MinCb Log 2SizeY sps_max_mtt_hierarchy_depth_inter_slice specifies the default maximum hierarchy depth for coding units resulting from multi-type tree splitting of a quadtree leaf in slices with slice type equal to 0 (B) or 1 (P) referring to the SPS. When partition_constraints_override_flag is equal to 1, the default maximum hierarchy depth can be overridden by slice_max_mtt_hierarchy_depth_luma present in the slice header of the slices referring to the SPS. The value of sps_max_mtt_hierarchy_depth_inter_slice shall be in the range of 0 to Ctb Log 2SizeY−MinCb Log 2SizeY, inclusive.

sps_max_mtt_hierarchy_depth_intra_slice_luma specifies the default maximum hierarchy depth for coding units resulting from multi-type tree splitting of a quadtree leaf in slices with slice_type equal to 2 (I) referring to the SPS. When partition_constraints_override_flag is equal to 1, the default maximum hierarchy depth can be overridden by slice_max_mtt_hierarchy_depth_luma present in the slice header of the slices referring to the SPS. The value of sps_max_mtt_hierarchy_depth_intra_slice_luma shall be in the range of 0 to Ctb Log 2SizeY−MinCb Log 2SizeY, inclusive.

sps_log 2_diff_max_bt_min_qt_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) referring to the SPS. When partition_constraints_override_flag is equal to 1, the default difference can be overridden by slice_log 2_diff_max_bt_min_qt_luma present in the slice header of the slices referring to the SPS. The value of sps_log 2_diff_max_bt_min_qt_intra_slice_luma shall be in the range of 0 to Ctb Log 2SizeY−MinQt Log 2SizeIntraY, inclusive. When sps_log 2_diff_max_bt_min_qt_intra_slice_luma is not present, the value of sps_log 2_diff_max_bt_min_qt_intra_slice_luma is inferred to be equal to 0. sps_log 2_diff_max_tt_min_qt_intra_slice_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice type equal to 2 (I) referring to the SPS. When partition_constraints_override_flag is equal to 1, the default difference can be overridden by slice_log 2_diff_max_tt_min_qt_luma present in the slice header of the slices referring to the SPS. The value of sps_log 2_diff_max_tt_min_qt_intra_slice_luma shall be in the range of 0 to Ctb Log 2SizeY−MinQt Log 2SizeIntraY, inclusive. When sps_log 2_diff_max_tt_min_qt_intra_slice_luma is not present, the value of sps_log 2_diff_max_tt_min_qt_intra_slice_luma is inferred to be equal to 0.

sps_log 2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 0 (B) or 1 (P) referring to the SPS. When partition_constraints_override_flag is equal to 1, the default difference can be overridden by slice_log 2_diff_max_bt_min_qt_luma present in the slice header of the slices referring to the SPS. The value of sps_log 2_diff_max_bt_min_qt_inter_slice shall be in the range of 0 to Ctb Log 2SizeY−MinQt Log 2SizeInterY, inclusive. When sps_log 2_diff_max_bt_min_qt_inter slice is not present, the value of sps_log 2_diff_max_bt_min_qt_inter slice is inferred to be equal to 0.

sps_log 2_diff_max_tt_min_qt_inter_slice specifics the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) referring to the SPS. When partition_constraints_override_flag is equal to 1, the default difference can be overridden by slice_log 2_diff_max_tt_min_qt_luma present in the slice header of the slices referring to the SPS. The value of sps_log 2_diff_max_tt_min_qt_inter_slice shall be in the range of 0 to Ctb Log 2SizeY−MinQt Log 2SizeInterY, inclusive. When sps_log 2_diff_max_tt_min_qt_inter slice is not present, the value of sps_log 2_diff max tt min at inter slice is inferred to be equal to 0.

sps_log 2_diff_min_qt_min_cb_intra_slice_chroma specifies the default difference between the base 2 logarithm of the minimum size in luma samples of a chroma leaf block resulting from quadtree splitting of a chroma CTU with trecType equal to DUAL_TREE_CHROMA and the base 2 logarithm of the minimum coding block size in luma samples for chroma CUs with treeType equal to DUAL_TREE_CHROMA in slices with slice_type equal to 2 (I)

referring to the SPS. When partition_constraints_override_flag is equal to 1, the default difference can be overridden by slice_log 2_diff_min_qt_min_cb_chroma present in the slice header of the slices referring to the SPS. The value of sps_log 2_diff_min_qt_min_cb_intra_slice_chroma shall be in the range of 0 to Ctb Log 2SizeY−MinCb Log 2SizeY, inclusive. When not present, the value of sps_log 2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

MinQt Log 2SizeIntraC=sps_log 2_diff_min_qt_min_cb_intra_slice_chroma+MinCb Log 2SizeY sps_max_mtt_hierarchy_depth_intra_slice_chroma specifies the default maximum hierarchy depth for chroma coding units resulting from multi-type tree splitting of a chroma quadtree leaf with treeType equal to DUAL_TREE_CHROMA in slices with slice_type equal to 2 (I) referring to the SPS. When partition_constraints_override_flag is equal to 1, the default maximum hierarchy depth can be overridden by slice_max_mtt_hierarchy_depth_chroma present in the slice header of the slices referring to the SPS. The value of sps_max_mtt_hierarchy_depth_intra_slice_chroma shall be in the range of 0 to Ctb Log 2SizeY−MinCb Log 2SizeY, inclusive. When not present, the value of sps_max_mtt_hierarchy_depth_intra_slice_chroma is inferred to be equal to 0.

sps_log 2_diff_max_bt_min_qt_intra_slice_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_flag is equal to 1, the default difference can be overridden by slice_log 2_diff_max_bt_min_qt_chroma present in the slice header of the slices referring to the SPS. The value of sps_log 2_diff_max_bt_min_qt_intra_slice_chroma shall be in the range of 0 to Ctb Log 2SizeY−MinQt Log 2SizeIntraC, inclusive. When sps_log 2_diff_max_bt_min_qt_intra_slice_chroma is not present, the value of sps_log 2_diff_max_bt_min_qt_intra_slice_chroma is inferred to be equal to 0.

sps_log 2_diff_max_tt_min_qt_intra_slice_chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_flag is equal to 1, the default difference can be overridden by slice_log 2_diff_max_tt_min_qt_chroma present in the slice header of the slices referring to the SPS. The value of sps_log 2_diff_max_tt_min_qt_intra_slice_chroma shall be in the range of 0 to Ctb Log 2SizeY−MinQt Log 2SizeIntraC, inclusive. When sps_log 2_diff_max_tt_min_qt_intra_slice_chroma is not present, the value of sps_log 2_diff_max_tt_min_qt_intra_slice_chroma is inferred to be equal to 0.

sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process.

sps_alf_enabled_flag equal to 0 specifies that the adaptive loop filter is disabled. sps_alf_enabled_flag equal to 1 specifies that the adaptive loop filter is enabled.

sps_pcm_enabled_flag equal to 0 specifies that PCM-related syntax (pcm_sample_bit_depth_luma_minus1, pcm_sample_bit_depth_chroma_minus1, log 2_min_pcm_luma_coding_block_size_minus3, log 2_diff_max_min_pcm_luma_coding_block_size, pcm_loop_filter_disabled_flag, pcm_flag, pcm_alignment_zero_bit syntax elements and pcm_sample( ) syntax structure) is not present in the CVS.

NOTE—When MinCb Log 2SizeY is equal to 6 and sps_pcm_enabled_flag is equal to 1, PCM sample data-related syntax (pcm_flag, pcm_alignment_zero_bit syntax elements and pcm_sample( ) syntax structure) is not present in the CVS, because the maximum size of coding blocks that can convey PCM sample data-related syntax is restricted to be less than or equal to Min(Ctb Log 2SizeY, 5). Hence, MinCb Log 2SizeY equal to 6 with sps_pcm_enabled_flag equal to 1 is not an appropriate setting to convey PCM sample data in the CVS.

pcm_sample_bit_depth_luma_minus1 specifies the number of bits used to represent each of PCM sample values of the luma component as follows:

$PcmBitDepth_Y$=pcm_sample_bit_depth_luma_minus1+1

The value of $PcmBitDepth_Y$ shall be less than or equal to the value of $BitDepth_Y$.

pcm_sample bit_depth_chroma_minus1 specifies the number of bits used to represent each of PCM sample values of the chroma components as follows:

$PcmBitDepth_C$=pcm_sample_bit_depth_chroma_minus1+1

The value of $PcmBitDepth_C$ shall be less than or equal to the value of $BitDepth_C$. When ChromaArrayType is equal to 0, pcm_sample_bit_depth_chroma_minus1 is not used in the decoding process and decoders shall ignore its value.

log 2_min_pcm_luma_coding_block_size_minus3 plus 3 specifies the minimum size of coding blocks with pcm_flag equal to 1.

The variable Log 2MinIpcmCbSizeY is set equal to log 2_min_pcm_luma_coding_block_size_minus3+3. The value of Log 2MinIpcmCbSizeY shall be in the range of Min(MinCb Log 2SizeY, 5) to Min(Ctb Log 2SizeY, 5), inclusive.

log 2_diff_max_min_pcm_luma_coding_block_size specifies the difference between the maximum and minimum size of coding blocks with pcm_flag equal to 1.

The variable Log 2MaxIpcmCbSizeY is set equal to log 2_diff_max_min_pcm_luma_coding_block_size+Log 2MinIpcmCbSizeY. The value of Log 2MaxIpcmCbSizeY shall be less than or equal to Min(Ctb Log 2SizeY, 5).

pcm_loop_filter_disabled_flag specifies whether the loop filter process is disabled on reconstructed samples in a coding unit with pcm_flag equal to 1 as follows:

If pcm_loop_filter_disabled_flag is equal to 1, the deblocking filter, sample adaptive offset filter, and adaptive loop filter processes on the reconstructed samples in a coding unit with pcm_flag equal to 1 are disabled.

Otherwise (pcm_loop_filter_disabled_flag value is equal to 0), the deblocking filter, sample adaptive offset filter, and adaptive loop filter processes on the reconstructed samples in a coding unit with pcm_flag equal to 1 are not disabled.

When pcm_loop_filter_disabled_flag is not present, it is inferred to be equal to 0.

sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied. When not present, the value of sps_ref_wraparound_enabled_flag is inferred to be equal to 0.

sps_ref_wraparound_offset_minus1 plus 1 specifies the offset used for computing the horizontal wrap-around position in units of MinCbSizeY luma samples. The value of ref_wraparound_offset_minus1 shall be in the range of (CtbSizeY/MinCbSizeY)+1 to (pic_width_in_luma_samples/MinCbSizeY)−1, inclusive.

sps_temporal_mvp_enabled_flag equal to 1 specifies that slice_temporal_mvp_enabled_flag is present in the slice headers of slices with slice_type not equal to I in the CVS. sps_temporal_mvp_enabled_flag equal to 0 specifies that slice_temporal_mvp_enabled_flag is not present in slice headers and that temporal motion vector predictors are not used in the CVS.

sps_sbtmvp_enabled_flag equal to 1 specifies that subblock-based temporal motion vector predictors may be used in decoding of pictures with all slices having slice type not equal to I in the CVS. sps_sbtmvp_enabled_flag equal to 0 specifies that subblock-based temporal motion vector predictors are not used in the CVS. When sps_sbtmvp_enabled_flag is not present, it is inferred to be equal to 0.

sps_amvr_enabled_flag equal to 1 specifies that adaptive motion vector difference resolution is used in motion vector coding. amvr_enabled_flag equal to 0 specifies that adaptive motion vector difference resolution is not used in motion vector coding.

sps_bdof_enabled_flag equal to 0 specifies that the bidirectional optical flow inter prediction is disabled. sps_bdof_enabled_flag equal to 1 specifies that the bidirectional optical flow inter prediction is enabled.

sps_smvd_enabled_flag equal to 1 specifies that symmetric motion vector difference may be used in motion vector decoding. sps_smvd_enabled_flag equal to 0 specifies that symmetric motion vector difference is not used in motion vector coding.

sps_affine_amvr_enabled_flag equal to 1 specifies that adaptive motion vector difference resolution is used in motion vector coding of affine inter mode. sps_affine_amvr_enabled_flag equal to 0 specifies that adaptive motion vector difference resolution is not used in motion vector coding of affine inter mode.

sps_dmvr_enabled_flag equal to 1 specifies that decoder motion vector refinement based inter bi-prediction is enabled. sps_dmvr_enabled_flag equal to 0 specifies that decoder motion vector refinement based inter bi-prediction is disabled.

sps_mmvd_enabled_flag equal to 1 specifies that merge mode with motion vector difference is enabled. sps_mmvd_enabled_flag equal to 0 specifies that merge mode with motion vector difference is disabled.

sps_isp_enabled_flag equal to 1 specifies that intra prediction with subpartitions is enabled. sps_isp_enabled_flag equal to 0 specifies that intra prediction with subpartitions is disabled.

sps_mrl_enabled_flag equal to 1 specifies that intra prediction with multiple reference lines is enabled. sps_mrl_enabled_flag equal to 0 specifies that intra prediction with multiple reference lines is disabled.

sps_mip_enabled_flag equal to 1 specifies that matrix-based intra prediction is enabled. sps_mrl_enabled_flag equal to 0 specifies that matrix-based intra prediction is disabled.

sps_cclm_enabled_flag equal to 0 specifies that the cross-component linear model intra prediction from luma component to chroma component is disabled. sps_cclm_enabled_flag equal to 1 specifies that the cross-component linear model intra prediction from luma component to chroma component is enabled.

sps_cclm_colocated_chroma_flag equal to 1 specifies that the top-left downsampled luma sample in cross-component linear model intra prediction is collocated with the top-left luma sample. sps_cclm_colocated_chroma_flag equal to 0 specifies that the top-left downsampled luma sample in cross-component linear model intra prediction is horizontally co-sited with the top-left luma sample but vertically shifted by 0.5 units of luma samples relatively to the top-left luma sample.

sps_mts_enabled_flag equal to 1 specifies that sps_explicit_mts_intra_enabled_flag is present in the sequence parameter set RBSP syntax and that sps_explicit_mts_inter_enabled_flag is present in the sequence parameter set RBSP syntax. sps_mts_enabled_flag equal to 0 specifies that sps_explicit_mts_intra_enabled_flag is not present in the sequence parameter set RBSP syntax and that sps_explicit_mts_inter_enabled_flag is not present in the sequence parameter set RBSP syntax. sps_explicit_mts_intra_enabled_flag equal to 1 specifies that tu_mts_idx may be present in the transform unit syntax for intra coding units. sps_explicit_mts_intra_enabled flag equal to 0 specifies that tu_mts_idx is not present in the transform unit syntax for intra coding units. When not present, the value of sps_explicit_mts_intra_enabled flag is inferred to be equal to 0.

sps_explicit_mts_inter_enabled_flag equal to 1 specifies that tu_mts_idx may be present in the transform unit syntax for inter coding units. sps_explicit_mts_inter_enabled_flag equal to 0 specifies that tu_mts_idx is not present in the transform unit syntax for inter coding units. When not present, the value of sps_explicit_mts_inter_enabled_flag is inferred to be equal to 0.

sps_sbt_enabled_flag equal to 0 specifies that subblock transform for inter-predicted CUs is disabled. sps_sbt_enabled_flag equal to 1 specifies that subblock transform for inter-predicted CU is enabled.

sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

$$MaxSbtSize = sps\_sbt\_max\_size\_64\_flag\,?\,64\,:\,32$$

sps_affine_enabled_flag specifies whether affine model based motion compensation can be used for inter prediction. If sps_affine_enabled_flag is equal to 0, the syntax shall be constrained such that no affine model based motion compensation is used in the CVS, and inter_affine_flag and cu_affine_type_flag are not present in coding unit syntax of the CVS. Otherwise (sps_affine_enabled_flag is equal to 1), affine model based motion compensation can be used in the CVS.

sps_affine_type_flag specifies whether 6-parameter affine model based motion compensation can be used for inter prediction. If sps_affine_type_flag is equal to 0, the syntax shall be constrained such that no 6-parameter affine model based motion compensation is used in the CVS, and cu_affine_type_flag is not present in coding unit syntax in the CVS. Otherwise (sps_affine_type_flag is equal to 1), 6-parameter affine model based motion compensation can be used in the CVS. When not present, the value of sps_affine_type_flag is inferred to be equal to 0.

sps_bcw_enabled_flag specifies whether bi-prediction with CU weights can be used for inter prediction. If sps_bcw_enabled_flag is equal to 0, the syntax shall be constrained such that no bi-prediction with CU weights is used in the CVS, and bcw_idx is not present in coding unit syntax of the CVS. Otherwise (sps_bcw_enabled_flag is equal to 1), bi-prediction with CU weights can be used in the CVS.

sps_ibc_enabled_flag equal to 1 specifies that current picture referencing may be used in decoding of pictures in the CVS. sps_ibc_enabled_flag equal to 0 specifies that current picture referencing is not used in the CVS. When sps_ibc_enabled_flag is not present, it is inferred to be equal to 0.

sps_ciip_enabled_flag specifies that ciip_flag may be present in the coding unit syntax for inter coding units. sps_ciip_enabled_flag equal to 0 specifies that ciip_flag is not present in the coding unit syntax for inter coding units.

sps_fpel_mmvd_enabled_flag equal to 1 specifies that merge mode with motion vector difference is using integer sample precision. sps_fpel_mmvd_enabled_flag equal to 0 specifies that merge mode with motion vector difference can use fractional sample precision.

sps_triangle_enabled_flag specifies whether triangular shape based motion compensation can be used for inter prediction. sps_triangle_enabled_flag equal to 0 specifies that the syntax shall be constrained such that no triangular shape based motion compensation is used in the CVS, and merge_triangle_split_dir, merge_triangle_idx0, and merge_triangle_idx1 are not present in coding unit syntax of the CVS. sps_triangle_enabled_flag equal to 1 specifies that triangular shape based motion compensation can be used in the CVS.

sps_lmcs_enabled_flag equal to 1 specifies that luma mapping with chroma scaling is used in the CVS. sps_lmcs_enabled_flag equal to 0 specifies that luma mapping with chroma scaling is not used in the CVS.

sps_ladf_enabled_flag equal to 1, specifics that sps_num_ladf_intervals_minus2, sps_ladf_lowest_interval_qp_offset, sps_ladf_qp_offset[i], and sps_ladf_delta_threshold_minus1[i] are present in the SPS.

sps_num_ladf_intervals_minus2 plus 1 specifies the number of sps_ladf_delta_threshold_minus1[i] and sps_ladf_qp_offset[i] syntax elements that are present in the SPS. The value of sps_num_ladf_intervals_minus2 shall be in the range of 0 to 3, inclusive.

sps_ladf_lowest_interval_qp_offset specifics the offset used to derive the variable qP as specified. The value of sps_ladf_lowest_interval_qp_offset shall be in the range of 0 to 63, inclusive.

sps_ladf_qp_offset[i] specifies the offset array used to derive the variable qP as specified. The value of sps_ladf_qp_offset[i] shall be in the range of 0 to 63, inclusive.

sps_ladf_delta_threshold_minus1[i] is used to compute the values of SpsLadfIntervalLowerBound[i], which specifies the lower bound of the i-th luma intensity level interval. The value of sps_ladf_delta_threshold_minus1[i] shall be in the range of 0 to $2^{BitDepthY}-3$, inclusive.

The value of SpsLadfIntervalLowerBound[0] is set equal to 0.

For each value of i in the range of 0 to sps_num_ladf_intervals_minus2, inclusive, the variable SpsLadfIntervalLowerBound[i+1] is derived as follows:

SpsLadfIntervalLowerBound[$i$+1]=SpsLadfIntervalLowerBound[$i$]+sps_ladf_delta_threshold_minus1[$i$]+1 timing_info_present_flag equal to 1 specifies that the syntax elements num_units_in_tick, time_scale, and hrd_parameters_present_flag are present in the SPS RBSP syntax structure. timing_info_present_flag equal to 0 specifies that num_units_in_tick, time_scale, and hrd_parameters_present_flag are not present in the SPS RBSP syntax structure.

num_units_in_tick is the number of time units of a clock operating at the frequency time_scale Hz that corresponds to one increment (called a clock tick) of a clock tick counter. num_units_in_tick shall be greater than 0. A clock tick, in units of seconds, is equal to the quotient of num_units_in_tick divided by time_scale. For example, when the picture rate of a video signal is 25 Hz, time_scale may be equal to 27 000 000 and num_units_in_tick may be equal to 1 080 000, and consequently a clock tick may be equal to 0.04 seconds.

time_scale is the number of time units that pass in one second. For example, a time coordinate system that measures time using a 27 MHz clock has a time_scale of 27 000 000. The value of time_scale shall be greater than 0.

hrd_parameters_present_flag equal to 1 specifies that the syntax structure hrd_parameters( ) is present in the SPS RBSP syntax structure. hrd_parameters_present_flag equal to 0 specifies that the syntax structure hrd_parameters( ) is not present in the SPS RBSP syntax structure.

vui_parameters_present_flag equal to 1 specifics that the syntax structure vui_parameters( ) is present in the SPS RBSP syntax structure. vui_parameters_present_flag equal to 0 specifies that the syntax structure vui_parameters( ) is not present in the SPS RBSP syntax structure.

sps_extension_flag equal to 0 specifies that no sps_extension_data_flag syntax elements are present in the SPS RBSP syntax structure. sps_extension_flag equal to 1 specifies that there are sps_extension_data_flag syntax elements present in the SPS RBSP syntax structure.

sps_extension_data_flag may have any value. Its presence and value do not affect decoder conformance to profiles specified in this version of this Specification. Decoders conforming to this version of this Specification shall ignore all sps_extension_data_flag syntax elements As illustrated in Table 3, hrd_parameters_present_flag specifies whether the syntax structure hrd_parameters( ) is present in the SPS RBSP syntax structure. The syntax structure hrd_parameters( ) provides so-called hypothetical reference decoder (HRD) parameters. Typically, a video coding standard specifies an HRD which may be used to check bitstream and decoder conformance. For example, a video coding standard may specify a HRD containing a coded picture buffer (CPB), an instantaneous decoding process, a decoded picture buffer (DPB), and output cropping and corresponding conformance tests. HRD parameter values may specify which/how conformance tests are to be performed. Thus, a video decoder may perform conformance tests based on received HRD parameter values to determine if a bitstream is in conformance. Further, a video decoder may use timing information provided in HRD parameter values to determine optimal times to output decoded pictures, which may provide optimal video quality. A HRD operation and signaled HRD parameters for a conforming bitstream may guarantee that when decoding the bitstream with specified buffer sizes, specified bitrates, and with specified initial buffering delay, the video buffer will never overflow or underflow. In this context, buffer overflow may mean that the video buffer has received new data, but it does not have capacity to fill the video buffer with that data because it is already full with data yet to be decoded or displayed. Also, in this context, buffer underflow may mean that the video decoder is in a state where it can decode the next picture from the data in the video buffer (e.g., to be able to present it uninterrupted to the user), but it does not have any data in its buffer. In this manner, a video decoder may decode coded video based on signaled HRD parameters.

JVET-N1001 specifies an HRD. Table 4 illustrates the hrd_parameters( ) syntax structure provided in JVET-N1001.

TABLE 4

| | Descriptor |
|---|---|
| hrd_parameters( maxNmnSubLayersMinus1 ) { | |
|   vui_nal_hrd_parameters_present_flag | u(1) |
|   vui_vcl_hrd_parameters_present_flag | u(1) |
|   if( vui_nal_hrd_parameters_present_flag  || | |
| vui_vcl_hrd_parameters_present_flag ){ | |
|     bit_rate_scale | u(4) |
|     cpb_size_scale | u(4) |
|   } | |
|   for( i = 0; i  <=  maxNumSubLayersMinus1; i++ ) { | |
|     fixed_pic_rate_general_flag[ i ] | u(1) |
|     if( !fixed_pic_rate_general_flag[ i ] ) | |
|       fixed_pic_rate_within_cvs_flag[ i ] | u(1) |
|     if( fixed_pic_rate_within_cvs_flag[ i ] ) | |
|       elemental_duration_in_tc_minus1[ i ] | ue(v) |
|     else | |
|       low_delay_hrd_flag[ i ] | u(1) |
|     if( !low_delay_hrd_flag[ i ] ) | |
|       vui_cpb_cnt_minus1[ i ] | ue(v) |
|     if( vui_nal_hrd_parameters_present_flag ) | |
|       sub_layer_hrd_parameters( i ) | |
|     if( vui_vcl_hrd_parameters_present_flag ) | |
|       sub_layer_hrd_parameters( i ) | |
|   } | |
| } | |

With respect to Table 4, JVET-N1001 provides the following semantics:

The hrd_parameters( ) syntax structure provides HRD parameters used in the HRD operations.

vui_nal_hrd_parameters_present_flag equal to 1 specifies that NAL HRD parameters (pertaining to Type II bitstream conformance) are present in the hrd_parameters( ) syntax structure, vui_nal_hrd_parameters_present_flag equal to 0 specifies that NAL HRD parameters are not present in the hrd_parameters( ) syntax structure.

NOTE—When vui_nal_hrd_parameters_present_flag is equal to 0, the conformance of the bitstream cannot be verified without provision of the NAL HRD parameters and all buffering period and picture timing SET messages, by some means not specified in this Specification.

The variable NalHrdBpPresentFlag is derived as follows:
If one or more of the following conditions are true, the value of NalHrdBpPresentFlag is set equal to 1:
  vui_nal_hrd_parameters_present_flag is present in the bitstream and is equal to 1.
  The need for presence of buffering periods for NAL HRD operation to be present in the bitstream in buffering period SEI messages is determined by the application, by some means not specified in this Specification.
Otherwise, the value of NalHrdBpPresentFlag is set equal to 0.

vui_vcl_hrd_parameters_present_flag equal to 1 specifies that VCL HRD parameters (pertaining to all bitstream conformance) are present in the hrd_parameters( ) syntax structure, vui_vcl_hrd_parameters_present_flag equal to 0 specifics that VCL HRD parameters are not present in the hrd_parameters( ) syntax structure.

NOTE—When vui_vcl_hrd_parameters_present flag is equal to 0, the conformance of the bitstream cannot be verified without provision of the VCL HRD parameters and all buffering period and picture timing SEI messages, by some means not specified in this Specification.

The variable VclHrdBpPresentFlag is derived as follows:
If one or more of the following conditions are true, the value of VclHrdBpPresentFlag is set equal to 1:
  vui_vcl_hrd_parameters_present_flag is present in the bitstream and is equal to 1.
  The need for presence of buffering periods for VCL HRD operation to be present in the bitstream in buffering period SEI messages is determined by the application, by some means not specified in this Specification.
Otherwise, the value of VclHrdBpPresentFlag is set equal to 0.

The variable CpbDpbDelaysPresentFlag is derived as follows:
If one or more of the following conditions are true, the value of CpbDpbDelaysPresentFlag is set equal to 1:
  vui_nal_brd_parameters_present_flag is present in the bitstream and is equal to 1.
  vui_vcl_hrd_parameters_present_flag is present in the bitstream and is equal to 1.
  The need for presence of CPB and DPB output delays to be present in the bitstream in picture timing SEI messages is determined by the application, by some means not specified in this Specification.
Otherwise, the value of CpbDpbDelaysPresentFlag is set equal to 0.

bit_rate_scale (together with bit_rate_value_minus1[i]) specifies the maximum input bit rate of the i-th CPB.

cpb_size_scale (together with cpb_size_value_minus1[i]) specifies the CPB size of the i-th CPB when the CPB operates at the access unit level.

fixed_pic_rate_general_flag[i] equal to 1 indicates that, when HighestTid is equal to i, the temporal distance between the HRD output times of consecutive pictures in output order is constrained as specified below, fixed_pic_rate_general_flag[i] equal to 0 indicates that this constraint may not apply.

When fixed_pic_rate_general_flag[i] is not present, it is inferred to be equal to 0.

fixed_pic_rate_within_cvs_flag[i] equal to 1 indicates that, when HighestTid is equal to i, the temporal distance between the HRD output times of consecutive pictures in output order is constrained as specified below, fixed_pic_rate_within_cvs_flag[i] equal to 0 indicates that this constraint may not apply.

When fixed_pic_rate_general_flag[i] is equal to 1, the value of fixed_pic_rate_within_cvs_flag[i] is inferred to be equal to 1.

elemental_duration_in_tc_minus1[i] plus 1 (when present) specifics, when HighestTid is equal to i, the temporal distance, in clock ticks, between the elemental units that specify the HRD output times of consecutive pictures in output order as specified below. The value of elemental_duration_in_tc_minus1[i] shall be in the range of 0 to 2047, inclusive.

For each picture n that is output and not the last picture in the bitstream (in output order) that is output, the value of the variable DpbOutputElementalInterval[n] is specified by:

DpbOutputElementalInterval[$n$]=DpbOutputInterval[$n$]+DeltaToDivisor where DpbOutputInterval[n] is specified in Equation C-13 (i.e., DpbOutputInterval[n]=DpbOutputTime[nextPicInOutputOrder]−DpbOutputTime[n]) and DeltaToDivisor is specified in Table 5 based on the value of frame_field_info_present_flag and pic_struct for the CVS containing picture n. Entries marked "-" in Table 5 indicate a lack of dependence of DeltaToDivisor on the corresponding syntax element.

When HighestTid is equal to i and fixed_pic_rate_general_flag[i] is equal to 1 for a CVS containing picture n, the value computed for DpbOutputElementalInterval[n] shall be equal to ClockTick*(elemental_duration_in_tc_minus1[i]+1), wherein ClockTick is as specified in Equation C-1 (i.e., ClockTick=num_units_in_tick+time_scale) (using the value of ClockTick for the CVS containing picture n) when one of the following conditions is true for the following picture in output order nextPicInOutputOrder that is specified for use in Equation C-13:
  picture nextPicInOutputOrder is in the same CVS as picture n.
  picture nextPicInOutputOrder is in a different CVS and fixed_pic_rate_general_flag[i] is equal to 1 in the CVS containing picture nextPicInOutputOrder, the value of ClockTick is the same for both CVSs, and the value of elemental_duration_in_tc_minus1[i] is the same for both CVSs.

When HighestTid is equal to i and fixed_pic_rate_within_cvs_flag[i] is equal to 1 for a CVS containing picture n, the value computed for DpbOutputElementalInterval[n] shall be equal to ClockTick*(elemental_duration_in_tc_minus1[i]+1), wherein ClockTick is as specified in Equation C-1 (using the value of ClockTick for the CVS containing picture n) when the following picture in output order nextPicInOutputOrder that is specified for use in Equation C-13 is in the same CVS as picture n.

TABLE 5

| frame_field_info_present_flag | pic_struct | DeltaToDivisor |
|---|---|---|
| 0 | — | 1 |
| 1 | 1 | 1 |
| 1 | 2 | 1 |
| 1 | 0 | 2 |
| 1 | 3 | 2 |
| 1 | 4 | 2 |
| 1 | 5 | 3 |
| 1 | 6 | 3 |
| 1 | 7 | 2 |
| 1 | 8 | 3 |
| 1 | 9 | 1 |
| 1 | 10 | 1 |
| 1 | 11 | 1 |
| 1 | 12 | 1 | low_delay_hrd_flag[i] specifies the HRD operational mode, when HighestTid is equal to i. When not present, the value of low_delay_hrd_flag[i] is inferred to be equal to 0.

NOTE—When low_delay_hrd_flag[i] is equal to 1, "big pictures" that violate the nominal CPB removal times due to the number of bits used by an access unit are permitted. It is expected, but not required, that such "big pictures" occur only occasionally.

vui_cpb_cnt_minus1[i] plus 1 specifies the number of alternative CPB specifications in the bitstream of the CVS when HighestTid is equal to i. The value of vui_cpb_cnt_minus1[i] shall be in the range of 0 to 31, inclusive. When not present, the value of vui_cpb_cnt_minus1[i] is inferred to be equal to 0.

Table 6 illustrates the sub-layer HRD parameter set syntax structure provided in JVET-N1001.

TABLE 6

| | Descriptor |
|---|---|
| sub_layer_hrd_parameters( subLayerId ) { | |
|   for( i = 0; i  <=  CpbCnt; i++ ) { | |
|     bit_rate_value_minus1[ i ] | ue(v) |
|     cpb_size_value_minus1[ i ] | ue(v) |
|     cbr_flag[ i ] | u(1) |
|   } | |
| } | |

With respect to Table 6, JVET-N1001 provides the following semantics:

The variable CpbCnt is set equal to vui_cpb_cnt_minus1[subLayerId].

bit_rate_value_minus1[i] (together with bit_rate_scale) specifies the maximum input bit rate for the i-th CPB when the CPB operates at the access unit level. bit_rate_value_minus1[i] shall be in the range of 0 to $2^{32}-2$, inclusive. For any i>0, bit_rate_value_minus1[i] shall be greater than bit_rate_value_minus1[i−1]. The bit rate in bits per second is given by:

BitRate[$i$]=(bit_rate_value_minus1[$i$]+1)*$2^{(6+bit\_rate\_scale)}$

When the bit_rate_value_minus1[i] syntax element is not present, the value of BitRate[i] is inferred to be equal to CpbBrVclFactor*MaxBR for VCL HRD parameters and to be equal to CpbBrNalFactor*MaxBR for NAL HRD parameters, where MaxBR, CpbBrVclFactor and CpbBrNalFactor are specified in subclause A.4.]

cpb_size_value_minus1[i] is used together with cpb_size_scale to specify the i-th CPB size when the CPB operates at the access unit level, cpb_size_value_minus1[i] shall be in the range of 0 to $2^{32}-2$, inclusive. For any i greater than 0, cpb_size_value_minus1[i] shall be less than or equal to cpb_size_value_minus1[i−1].

The CPB size in bits is given by:

CpbSize[$i$]=(cpb_size_value_minus1[$i$]+1)*$2^{(4+cpb\_size\_scale)}$

When the cpb_size_value_minus1[i] syntax element is not present, the value of CpbSize[i] is inferred to be equal to CpbBrVclFactor*MaxCPB for VCL HRD parameters and to be equal to CpbBrNalFactor*MaxCPB for NAL HRD parameters, where MaxCPB, CpbBrVclFactor and CpbBrNalFactor are specified in subclause A.4.]

cbr_flag[i] equal to 0 specifies that to decode this bitstream by the HRD using the i-th CPB specification, the hypothetical stream scheduler (HSS) operates in an intermittent bit rate mode. cbr_flag[i] equal to 1 specifies that the HSS operates in a constant bit rate (CBR) mode. When not present, The value of cbr_flag[i] is inferred to be equal to 0.

It should be noted that although the semantics of syntax elements bit_rate_value_minus1 and cpb_size_value_minus1 include reference to subclause A.4 for specifying MaxCPB, CpbBrVclFactor and CpbBrNalFactor, JVET-N1001 does not define an Annex A and thus does not include subclause A.4 and a mechanism for specifying MaxBR, CpbBrVclFactor and CpbBrNalFactor. Techniques for specifying MaxCPB, CpbBrVclFactor and CpbBrNalFactor according to techniques herein are provided below with respect to Table 10.

As described above, JVET-N1001 enables SEI messages to be signaled which assist in processes related to decoding, display or other purposes. Further, as provided above in the semantics for Table 4, a type of SEI message for VCL HRD operations includes buffering period SEI messages. Table 7 illustrates the buffering_period( ) syntax structure provided in JVET-N1001.

TABLE 7

|  | Descriptor |
|---|---|
| buffering_period( payloadSize ) { |  |
|   bp_seq_parameter_set_id | ue(v) |
|   bp_nal_hrd_parameters_present_flag | u(1) |
|   bp_vcl_hrd_parameters_present_flag | u(1) |
|   if( bp_nal_hrd_parameters_present_flag \|\| bp_vcl_hrd_parameters_present_flag ) { |  |
|     initial_cpb_removal_delay_length_minus1 | u(5) |
|     cpb_removal_delay_length_minus1 | u(5) |
|     dpb_output_delay_length_minus1 | u(5) |
|   } |  |
|   concatenation_flag | u(1) |
|   cpb_removal_delay_delta_minus1 | u(v) |
|   cpb_removal_delay_deltas_present_flag | u(1) |
|   if( cpb_removal_delay_deltas_present_flag ) { |  |
|     num_cpb_removal_delay_deltas_minus1 | ue(v) |
|     for( i = 0; i <= num_cpb_removal_delay_deltas_minus1; i++ ) |  |
|       cpb_removal_delay_delta[ i ] | u(v) |
|   } |  |
|   bp_cpb_cnt_minus1 | ue(v) |
|   if( bp_nal_hrd_parameters_present_flag ) |  |
|     for( i = 0; i < bp_cpb_cnt_minus1 + 1; i++ ) { |  |
|       nal_initial_cpb_removal_delay[ i ] | u(v) |
|       nal_initial_cpb_removal_offset[ i ] | u(v) |
|     } |  |
|   if( bp_vcl_hrd_parameters_present_flag ) |  |
|     for( i = 0; i < bp_cpb_cnt_minus1 + 1; i++ ) { |  |
|       vcl_initial_cpb_removal_delay[ i ] | u(v) |
|       vcl_initial_cpb_removal_offset[ i ] | u(v) |
|     } |  |
| } |  |

With respect to Table 7, JVET-N1001 provides the following semantics:

A buffering period SET message provides initial CPB removal delay and initial CPB removal delay offset information for initialization of the HRD at the position of the associated access unit in decoding order.

When the buffering period SEI message is present, a picture is said to be a notDiscardablePic picture when the picture has TemporalId equal to 0 and is not a RASL or RADL picture.

When the current picture is not the first picture in the bitstream in decoding order, let prevNonDiscardablePic be the preceding picture in decoding order with TemporalId equal to 0 that is not a RASL or RADL picture.

The presence of buffering period SET messages is specified as follows:
  If NalHrdBpPresentFlag is equal to 1 or VclHrdBpPresentFlag is equal to 1, the following applies for each access unit in the CVS:
    If the access unit is an IRAP access unit, a buffering period SET message applicable to the operation point shall be associated with the access unit.
    Otherwise, if the access unit contains a notDiscardablePic, a buffering period SEI message applicable to the operation point may or may not be associated with the access unit.
    Otherwise, the access unit shall not be associated with a buffering period SET message applicable to the operation point.
  Otherwise (NalHrdBpPresentFlag and VclHrdBpPresentFlag are both equal to 0), no access unit in the CVS shall be associated with a buffering period SEI message.

NOTE—For some applications, frequent presence of buffering period SEI messages may be desirable (e.g., for random access at an IRAP picture or a non-IRAP picture or for bitstream splicing).

bp_seq_parameter_set_id indicates and shall be equal to the sps_seq_parameter_set_id for the SPS that is active for the coded picture associated with the buffering period SEI message. The value of bp_seq_parameter_set_id shall be equal to the value of pps_seq_parameter_set_id in the PPS referenced by the slice_pic_parameter_set_id of the slice headers of the coded picture associated with the buffering period SEI message. The value of bp_seq_parameter_set_id shall be in the range of 0 to 15, inclusive.

bp_nal_hrd_parameters_present_flag equal to 1 specifies that a list of syntax element pairs nal_initial_cpb_removal_delay[i] and nal_initial_cpb_removal_offset[i] are present in the buffering period SET message, bp_nal_hrd_parameters_present_flag equal to 0 specifies that no syntax element pairs nal_initial_cpb_removal_delay[i] and nal_initial_cpb_removal_offset[i] are present in the buffering period SEI message.

It is a requirement of bitstream conformance that the value of bp_nal_hrd_parameters_present_flag in the buffering period SEI message associated with an access unit is equal to the value of vui_nal_hrdparameters_present_flag in the VUI parameters of the active SPS.

bp_vcl_hrd_parameters_present_flag equal to 1 specifies that a list of syntax element pairs vcl_initial_cpb_removal_delay[i] and vcl_initial_cpb_removal_offset[i] are present in the buffering period SEI message, bp_vcl_hrd_parameters_present_flag equal to 0 specifies that no syntax element pairs vcl_initial_cpb_removal_delay[i] and vcl_initial_cpb_removal_offset[i] are present in the buffering period SET message.

It is a requirement of bitstream conformance that the value of bp_vcl_hrd_parameters_present_flag in the buffering period SEI message associated with an access unit is equal to the value of vui_vcl_hrd_parameters_present_flag in the VUI parameters of the active SPS.

initial_cpb_removal_delay_length_minus1 plus 1 specifies the length, in bits, of the syntax elements nal_initial_cpb_removal_delay[i], nal_initial_cpb_removal_offset[i], vcl_initial_cpb_removal_delay[i], and vcl_initial_cpb_removal_offset[i] of the buffering period SET message. When not present, the value of initial_cpb_removal_delay_length_minus1 is inferred to be equal to 23.

cpb_removal_delay length_minns1 plus 1 specifies the length, in bits, of the syntax elements cpb_removal_delay_delta_minus1 and cpb_removal_delay_delta[i] in the buffering period SET message and the syntax element cpb_removal_delay_minus1[i] in the picture timing SET message. When not present, the value of cpb_removal_delay_length_minus1 is inferred to be equal to 23.

dpb_output_delay_length_minus1 plus 1 specifies the length, in bits, of the syntax element dpb_output_delay in the picture timing SEI message. When not present, the value of dpb_output_delay_length_minus1 is inferred to be equal to 23.

concatenation_flag indicates, when the current picture is not the first picture in the bitstream in decoding order, whether the nominal CPB removal time of the current picture is determined relative to the nominal CPB removal time of the preceding picture with a buffering period SEI message or relative to the nominal CPB removal time of the picture prevNonDiscardablePic.

cpb_removal_delay_delta_minus1 plus 1, when the current picture is not the first picture in the bitstream in decoding order, specifies a CPB removal delay increment value relative to the nominal CPB removal time of the picture prevNonDiscardablePic. The length of this syntax element is cpb_removal_delay_length_minus1+1 bits.

When the current picture contains a buffering period SEI message and concatenation_flag is equal to 0 and the current picture is not the first picture in the bitstream in decoding order, it is a requirement of bitstream conformance that the following constraint applies:

If the picture prevNonDiscardablePic is not associated with a buffering period SET message, the cpb_removal_delay_minus1 of the current picture shall be equal to the cpb_removal_delay_minus1 of prevNonDiscardablePic plus cpb_removal_delay_delta_minus1+1.

Otherwise, cpb_removal_delay_minus1 shall be equal to cpb_removal_delay_delta_minus1.

NOTE—When the current picture contains a buffering period SEI message and concatenation_flag is equal to 1, the cpb_removal_delay_minus1 for the current picture is not used. The above-specified constraint can, under some circumstances, make it possible to splice bitstreams (that use suitably-designed referencing structures) by simply changing the value of concatenation flag from 0 to 1 in the buffering period SET message for an TRAP picture at the splicing point. When concatenation_flag is equal to 0, the above-specified constraint enables the decoder to check whether the constraint is satisfied as a way to detect the loss of the picture prevNonDiscardablePic.

cpb_removal_delay_deltas_present_flag equal to 1 specifies that the buffering period SEI message contains CPB removal delay deltas, cpb_removal_delay_deltas_present_flag equal to 0 specifies that no CPB removal delay deltas are present in the buffering period SEI message.

num_cpb_removal_delay_deltas_minus1 plus 1 specifies the number of syntax elements cpb_removal_delay_delta[i] in the buffering period SEI message. The value of num_cpb_removal_offsets_minus1 shall be in the range of 0 to 15, inclusive.

cpb_removal_delay_delta[i] specifies the i-th CPB removal delay delta. The length of this syntax element is cpb_removal_delay_length_minus1+1 bits.

bp_cpb_cnt_minus1 plus 1 specifies the number of syntax element pairs nal_initial_cpb_removal_delay[i] and nal_initial_cpb_removal_offset[i] when bp_nal_hrd_parameters_present_flag is equal to 1, and the number of syntax element pairs vcl_initial_cpb_removal_delay[i] and vcl_initial_cpb_removal_offset[i] when bp_vcl_hrd_parameters_present_flag is equal to 1. The value of bp_cpb_cnt_minus1 shall be in the range of 0 to 31, inclusive.

nal_initial_cpb_removal_delay[i] specify the i-th initial CPB removal delay for the NAL HRD in units of a 90 kHz clock. The length of nal_initial_cpb_removal_delay[i] is initial_cpb_removal_delay_length_minus1+1 bits. The value of nal_initial_cpb_removal_delay[i] shall not be equal to 0 and shall be less than or equal to 90000*(CpbSize[i]+ BitRate[i]), the time-equivalent of the CPB size in 90 kHz clock units.

nal_initial_cpb_removal_offset[i] specify the i-th initial CPB removal offset for the NAL HRD in units of a 90 kHz clock. The length of nal_initial_cpb_removal_offset[i] is initial_cpb_removal_delay_length_minus1+1 bits.

Over the entire CVS, the sum of nal_initial_cpb_removal_delay[i] and nal_initial_cpb_removal_offset[i] shall be constant for each value of i.

vcl_initial_cpb_removal_delay[i] specify the i-th initial CPB removal delay for the VCL HRD in units of a 90 kHz clock. The length of vcl_initial_cpb_removal_delay[i] is initial_cpb_removal_delay_length_minus1+1 bits. The value of vcl_initial_cpb_removal_delay[i] shall not be equal to 0 and shall be less than or equal to 90000*(CpbSize[i]+ BitRate[i]), the time-equivalent of the CPB size in 90 kHz clock units.

vcl_initial_cpb_removal_offset[i] specify the i-th initial CPB removal offset for the VCL HRD in units of a 90 kHz clock. The length of vcl_initial_cpb_removal_offset[i] is initial_cpb_removal_delay_length_minus1+1 bits.

Over the entire CVS, the sum of vcl_initial_cpb_removal_delay[i] and vcl_initial_cpb_removal_offset[i] shall be constant for each value of i.

Referring to Table 7 and the corresponding semantics, the buffering period SEI message signals initial CPB removal delay for NAL HRD and VCL HRD. This is accomplished by syntax elements nal_initial_cpb_removal_delay[i], nal_initial_cpb_removal_offset[i] for NAL HRD and vcl_initial_cpb_removal_delay[i], vcl_initial_cpb_removal_offset[i] for VCL HRD. A number (signalled via syntax element bp_cpb_cnt_minus1) of these NAL and VCL HRD initial CPB removal delays are signaled for different HRD schedule and it is allowed to select the appropriate initial CPB removal delay parameters based on the selected HRD schedule index (SchedSelIdx). However, one buffering period SEI message only signals initial CPB removal delay parameters for a particular HighestTid value. Since, the bitstream may operate at different highest TemporalID values and since initial CPB removal delay values are different for sub-bitstream with different number of temporal sub-layers, the signaling is less than ideal as signaling of initial CPB removal delays for all supported different HighestTid values for the bitstream in the buffering period SEI message is not allowed. According to the techniques herein, buffering period SEI message which allows signaling of initial CPB removal delays for all supported different HighestTid values for the bitstream is described and the appropriate selection of initial CPB removal delay parameters is enabled based on the selected HRD schedule and selected highest number of temporal sub-layers. This allows low overhead parameter signaling for initial CPB removal delay parameters.

The signaling of HRD parameters in JVET-N1001 is less than ideal. In particular, in JVET-N1001, when HRD parameters are present, a respective instance of HRD parameters is signaled for each temporal sub-layers. Such signaling may be inefficient as in some cases, temporal sub-layers may share a common set of HRD parameters. In other cases, requiring signaling HRD parameters for each temporal sub-layer may be burdensome since these parameters need to calculated using relatively complex formulas. According to the techniques described herein, a mechanism is provided for conditionally signaling a respective instance of HRD parameters for sub-layers. Further, inference rules are specified for the case where a respective instance of HRD parameters is not signaled for each sub-layer.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards. Data Over Cable Service Interface Specification (DOCSIS) standards, Global System Mobile Communications (GSM) standards, code division multiple access (CDMA) standards, 3rd Generation Partnership Project (3GPP) standards. European Telecommunications Standards Institute (ETSI) standards, Internet Protocol (IP) standards. Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
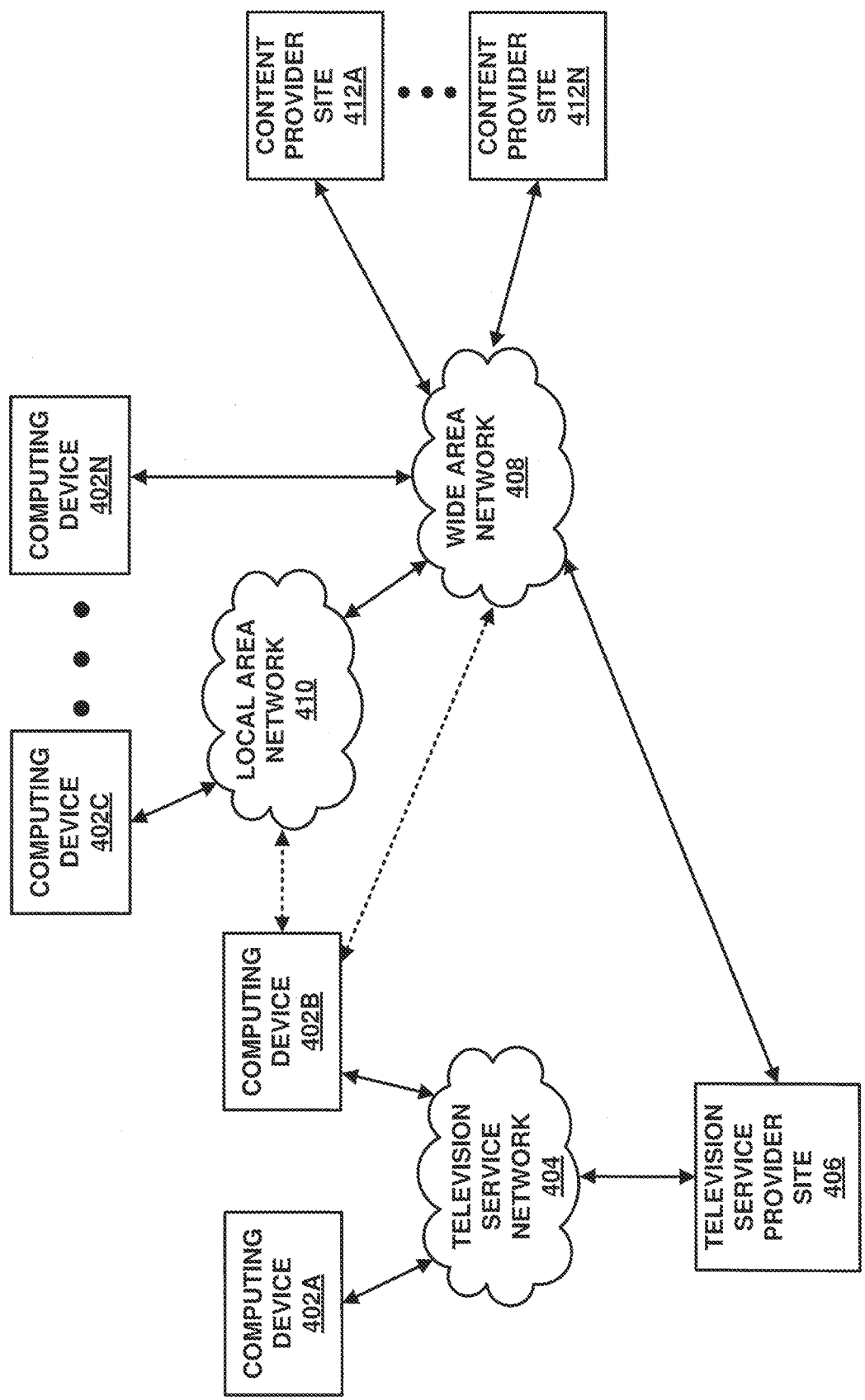
FIG. 4 is a conceptual drawing illustrating an example of components that may be included in an implementation of a system that may be configured to encode and decode video data according to one or more techniques of this this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards. ATSC standards, ISDB standards. DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, $3^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
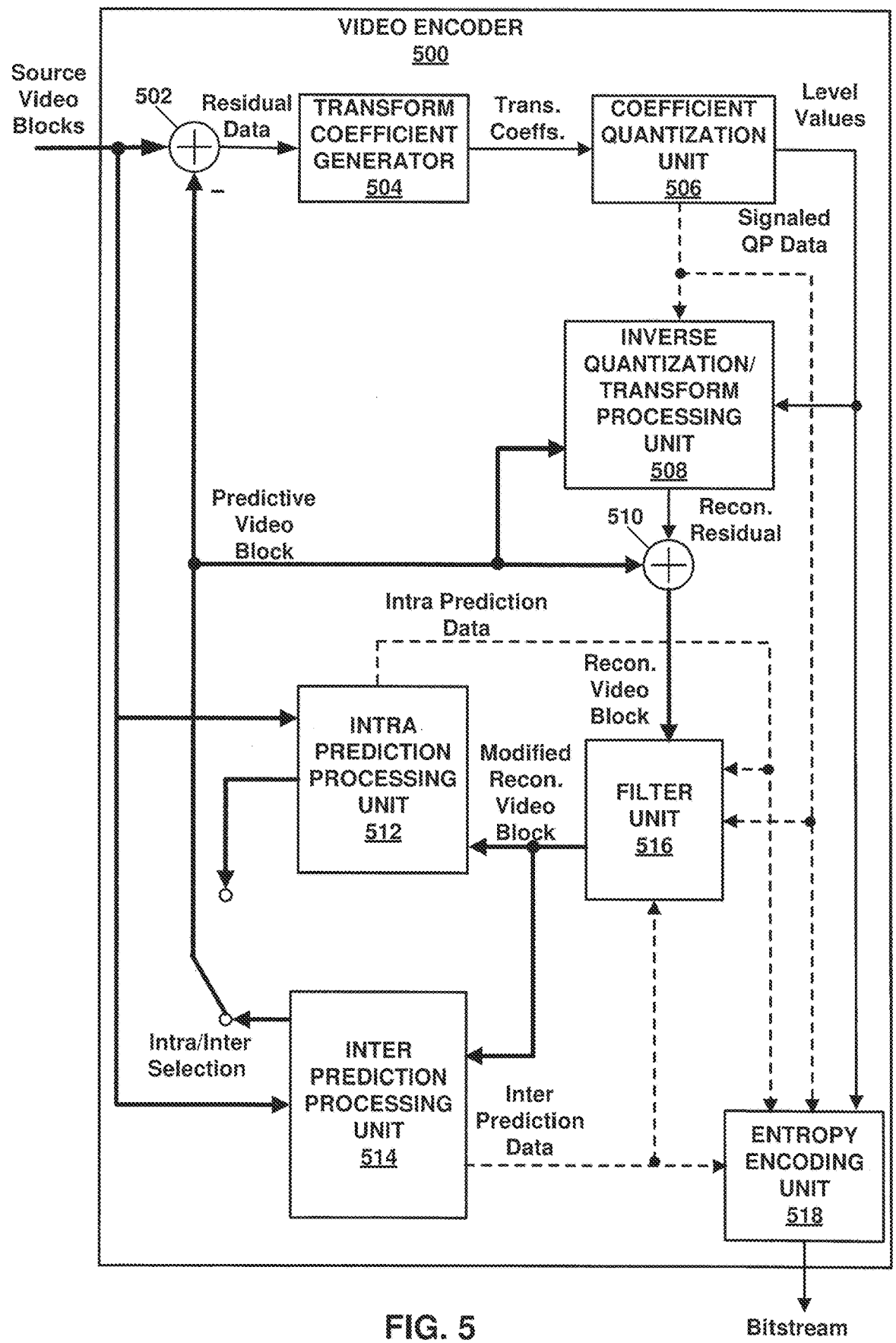
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs, quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a predication mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclosure.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

As described above, the signaling of HRD parameters in JVET-N1001 is less than ideal. According to the techniques herein, the signaling of HRD parameters for temporal sub-layers is controlled by a flag. That is, in one example, according to the techniques herein, whether respective HRD parameters are signaled for each temporal sub-layers or a single instance of HRD parameters is signaled for the all temporal sub-layers is controlled by flag. In the case where a single instance of HRD parameters is signaled for the all the temporal sub-layers, particular HRD parameters are inferred for each temporal sub-layer.

Table 8 illustrates an example of syntax of a sequence parameter set, which may be signaled according to the techniques herein.

TABLE 8

|  | Descriptor |
|---|---|
| seq_parameter_set_rbsp( ) { |  |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) |  |
|   ... |  |
|   timing_info_present_flag | u(1) |

TABLE 8-continued

| | Descriptor |
|---|---|
| if( timing_info_present_flag ) { | |
|     num_units_in_tick | u(32) |
|     time_scale | u(32) |
|     hrd_parameters_present_flag | u(1) |
|     if( hrd_parameters_present_flag ) { | |
|         sub_layer_cpb_parameters_present_flag | u(1) |
|         sub_layer_cpb_parameters_present_flag? | |
|         hrd_parameters( 0, sps_max_sub_layers_minus1 ) : hrd_parameters( sps_max_sub_layers_minus1 , sps_max_sub_layers_minus1 ) | |
|     } | |
| } | |
| vui_parameters_present_flag | u(1) |
| if( vui_parameters_present_flag ) | |
|     vui_parameters( ) | |
| sps_extension_flag | u(1) |
| if( sps_extension_flag ) | |
|     while( more___rbsp_data( ) ) | |
|         sps_extension_data_flag | u(1) |
| rbsp_trailing_bits( ) | |
| } | |

With respect to Table 8, the semantics may be based on the semantics provided above with respect to Table 3, for syntax element sub_layer_cpb_parameters_present_flag, in one example, the following semantics may be used:

sub_layer_cpb_parameters_present_flag equal to 1 specifies that syntax structure hrd_parameters( ) includes parameters for temporal sub-layers (sub layer hrd_parameters(i) for i) in the range of 0 to sps_max_sub_layers_minus1, inclusive. sub_layer_cpb_parameters_present_flag equal to 0 specifies that syntax structure hrd_parameters( ) includes parameters only for the sps_max_sub_layers_minus1'th temporal sub-layer.

In another example, the following semantics may be used:

sub_layer_cpb_parameters_present_flag equal to 1 specifies that syntax structure hrd_parameters( ) includes parameters for temporal sub-layers (sub_layer_hrd_parameters(i) for i) in the range of 0 to sps_max_sub_layers_minus1, inclusive. sub_layer_cpb_parameters_present_flag equal to 0 specifies that syntax structure hrd_parameters( ) includes parameters only for sub_layer_hrd_parameters(sps_max_sub_layers_minus) and these parameters apply to all the sub-layers.

In one example, one or more occurrences of the words "parameters for temporal sub-layers" may be changed to the words "parameters for temporal sub-layer representation" and the words "parameters only for sub_layer_hrd_parameters(sps_max_sub_layers_minus)" may be changed to the words "parameters only for highest temporal sub-layer representation".

Table 9 illustrates an example of an HRD syntax structure, which may be signaled according to the techniques herein.

TABLE 9

| | Descriptor |
|---|---|
| hrd_parameters( startNumSubLayers, maxNumSubLayersMinus1 ) { | |
|     vui_nal_hrd_parameters_present_flag | u(1) |
|     vui_vcl_hrd_parameters_present_flag | u(1) |
|     if( vui_nal_hrd_parameters_present_flag \|\| vui_vcl_hrd_parameters_present_flag ){ | |
|         bit_rate_scale | u(4) |
|         cpb_size_scale | u(4) |
|     } | |

TABLE 9-continued

| | Descriptor |
|---|---|
|     for( i = startNumSubLayers; i <= maxNumSubLayersMinus1; i++ ) { | |
|         fixed_pic_rate_general_flag[ i ] | u(1) |
|         if( !fixed_pic_rate_general_flag[ i ] ) | |
|             fixed_pic_rate_within_cvs_flag[ i ] | u(1) |
|         if( fixed_pic_rate_within_cvs_flag[ i ] ) | |
|             elemental_duration_in_tc_minus1[ i ] | ue(v) |
|         else | |
|             low_delay_hrd_flag[ i ] | u(1) |
|         if( !low_delay_hrd_flag[ i ] ) | |
|             vui_cpb_cnt_minus1[ i ] | ue(v) |
|         if( vui_nal_hrd_parameters_present_flag ) | |
|             sub_layer_hrd_parameters( i ) | |
|         if( vui_vcl_hrd_parameters_present_flag ) | |
|             sub_layer_hrd_parameters( i ) | |
|     } | |
| } | |

With respect to Table 9, the semantics may be based on the semantics provided above with respect to Table 4.

With respect to Table 6, above, in one example, according to the techniques herein, semantics may be based on the following semantics:

The variable CpbCnt is set equal to vui_cpb_cnt_minus1[subLayerId].

bit_rate_value_minus1[i] (together with bit_rate_scale) specifies the maximum input bit rate for the i-th CPB when the CPB operates at the access unit level. bit_rate_value_minus1[i] shall be in the range of 0 to $2^{32}-2$, inclusive. For any i>0, bit_rate_value_minus1[i] shall be greater than bit_rate_value_minus1[i−1].

The bit rate in bits per second is given by:

$$BitRate[i]=(bit\_rate\_value\_minus1[i]+1)*2^{(6+bit\_rate\_scale)}$$

When the bit_rate_value_minus1[i] syntax element is not present,

If bit_rate_value_minus1[sps_max_sub_layers_minus1] is present the value of BitRate[i] is inferred to be equal to BitRate[sps_max_sub_layers_minus1].

Otherwise, the value of BitRate[i] is inferred to be equal to CpbBrVclFactor*MaxBR for VCL HRD parameters and to be equal to CpbBrNalFactor*MaxBR for NAL HRD parameters, where MaxBR, CpbBrVclFactor and CpbBrNalFactor are specified as provided below.]

cpb_size_value_minus1[i] is used together with cpb_size_scale to specify the i-th CPB size when the CPB operates at the access unit level. cpb_size_value_minus1[i] shall be in the range of 0 to $2^{32}-2$, inclusive. For any i greater than 0, cpb_size_value_minus1[i] shall be less than or equal to cpb_size_value_minus1[i−1].

The CPB size in bits is given by:

$$CpbSize[i]=(cpb\_size\_value\_minus1[i]+1)*2^{(4+cpb\_size\_scale)}$$

When the cpb_size_value_minus1[i] syntax element is not present,

If cpb_size_value_minus1 [sps_max_sub_layers_minus1] is present the value of CpbSize[i] is inferred to be equal to CpbSize[sps_max_sub_layers_minus1].

Otherwise, the value of CpbSize[i] is inferred to be equal to CpbBrVclFactor*MaxCPB for VCL HRD parameters and to be equal to CpbBrNalFactor*MaxCPB for NAL HRD parameters, where MaxCPB, CpbBrVclFactor and CpbBrNalFactor are specified specified as provided below cbr_flag[i] equal to 0 specifies that to decode this bitstream by the HRD using the i-th CPB specification, the hypothetical stream scheduler (HSS) operates in an intermittent bit rate mode. cbr_flag[i] equal to 1 specifies that the HSS operates in a constant bit rate (CBR) mode. When not present, If cbr_flag[sps_max_sub_layers_minus1] is present the value of cbr_flag[i] is inferred to be equal to cbr_flag[sps_max_sub_layers_minus1].

Otherwise, the value of cbr_flag[i] is inferred to be equal to 0.

In another example, when not present, the value of cbr_flag[i] is inferred to be equal to 0.

As provided with respect to Table 8 and Table 9 and the updated semantics Table 6, according to the techniques herein the number of iterations of the loop for(i=start-NumSubLayers; i<=maxNumSubLayersMinus1; i+++) { . . . } is either one or maxNumSubLayersMinus1+1. As such, the amount of data used to signal HRD parameters may be reduced compared to JVET-N1001.

In one variant example, according to the techniques herein, an existing flag (instead of a new flag) in JVET-N1001 may be used to control whether HRD CPB parameters are signaled for each temporal sub-layers or only for the all the temporal sub-layers. In the case where the HRD CPB parameters are signaled for all the temporal sub-layers, they are inferred for each temporal sub-layer. For example, the flag sps_sub_layer_ordering_info_present_flag which is signaled in the SPS may be used instead of the new flag sub_layer_cpb_parameters_present_flag. In this case, in one example, the semantics of sps_sub_layer_ordering_info_present_flag may be as follows:

sps_sub_layer_ordering_info_present_flag equal to 1 specifies that sps_max_dec_pic_buffering_minus1[i], sps_max_num_reorder_pics[i], and sps_max_latency_increase_plus1[i] are present for sps_max_sub_layers_minus1+1 sub-layers and syntax structure hrd_parameters( ) includes parameters for temporal sub-layers (sub_layer_hrd_parameters(i) for i) in the range of 0 to sps_max_sub_layers_minus1, inclusive. sps_sub_layer_ordering_info_present_flag equal to 0 specifies that the values of sps_max_dec_pic_buffering_minus1[sps_max_sub_layers_minus1], sps_max_num_reorder_pics[sps_max_sub_layers_minus1], and sps_max_latency_increase_plus1[sps_max_sub_layers_minus1] apply to all sub-layers and also syntax structure hrd_parameters( ) includes parameters only for sub_layer_hrd_parameters(sps_max_sub_layers_minus) and these parameters apply to all the sub-layers.

As described above, JVET-N1001 does not define an Annex A for specifying MaxBR, CpbBrVclFactor and CpbBrNalFactor. In one example, according to the techniques herein, MaxBR, CpbBrVclFactor and CpbBrNalFactor may be defined as follows:

Let the variable CpbBrVclFactor be equal to 1000.
Let the variable CpbBrNalFactor be equal to 1100.
MaxBR may be as specified as in Table 10 below as a function of Level.

TABLE 10

| Level | Max luma sample rate MaxLumaSr (samples/sec) | Max bit rate MaxBR (1000 bits/s) | | Min Compression Ratio MinCr |
|---|---|---|---|---|
| | | Main tier | High tier | |
| 1 | 552960 | 128 | — | 2 |
| 2 | 3686400 | 1500 | — | 2 |
| 2.1 | 7372800 | 3000 | — | 2 |

TABLE 10-continued

| Level | Max luma sample rate MaxLumaSr (samples/sec) | Max bit rate MaxBR (1000 bits/s) | | Min Compression Ratio MinCr |
|---|---|---|---|---|
| | | Main tier | High tier | |
| 3 | 16588800 | 6000 | — | 2 |
| 3.1 | 33177600 | 10000 | — | 2 |
| 4 | 66846720 | 12000 | 30000 | 4 |
| 4.1 | 133693440 | 20000 | 50000 | 4 |
| 5 | 267386880 | 25000 | 100000 | 6 |
| 5.1 | 534773760 | 40000 | 160000 | 8 |
| 5.2 | 1069547520 | 60000 | 240000 | 8 |
| 6 | 1069547520 | 60000 | 240000 | 8 |
| 6.1 | 2139095040 | 120000 | 480000 | 8 |

As described above, the buffering period SEI message in JVET-N1001 is less than ideal. In one example, according to the techniques herein, a flag to specify if different highest temporal sub-layer representations related initial CPB removal delay values may be signaled. Further, in one example, if the flag is 1, then signaling initial CPB removal delay values for different highest temporal sub-layers supported by the bitstream, occurs. Further, operation of a coded picture buffer is modified to use the appropriate initial buffering delay parameters based on the HighestTid. Additionally, the BitRate and CpbSize values may be calculated for each temporal sub-layer representation separately.

Table 11 illustrates an example of an buffering period SEI message syntax structure, which may be signaled according to the techniques herein.

TABLE 11

| | Descriptor |
|---|---|
| buffering_period( payloadSize ) { | |
|   bp_seq_parameter_set_id | ue(v) |
|   bp_nal_hrd_parameters_present_flag | u(1) |
|   bp_vcl_hrd_parameters_present_flag | u(1) |
|   if( bp_nal_hrd_parameters_present_flag || bp_vcl_hrd_parameters_present_flag ) { | |
|     initial_cpb_removal_delay_length_minus1 | u(5) |
|     cpb_removal_delay_length_minus1 | u(5) |
|     dpb_output_delay_length_minus1 | u(5) |
|   } | |
|   concatenation_flag | u(1) |
|   cpb_removal_delay_delta_minus1 | u(v) |
|   cpb_removal_delay_deltas_present_flag | u(1) |
|   if( cpb_removal_delay_deltas_present_flag ) { | |
|     num_cpb_removal_delay_deltas_minus1 | ue(v) |
|     for( i = 0; i <= num_cpb_removal_delay_deltas_minus1; i++ ) | |
|       cpb_removal_delay_delta[ 1 ] | u(v) |
|   } | |
|   for( j = 0; j <= sps_max_sub_layas_minus1; j++ ) { | |
|     bp_cpb_cnt_minus1 [ j ] | ue(v) |
|     if( bp_nal_hrd_parameters_present_flag ) | |
|       for( i = 0; i < bp_cpb_cnt_minus1[ j ] + 1; i++ ) { | |
|         nal_initial_cpb_removal_delay[ i ] [ j ] | u(v) |
|         nal_initial_cpb_removal_offset[ i ] [ j ] | u(v) |
|       } | |
|     if( bp_vcl_hrd_parameters_present_flag ) | |
|       for( i = 0; i < bp_cpb_cnt_minus1[ j ] + 1; i++ ) { | |
|         vcl_initial_cpb_removal_delay[ i ] [ j ] | u(v) |
|         vcl_initial_cpb_removal_offset[ i ] [ j ] | u(v) |
|       } | |
|   } | |
| } | |

With respect to Table 11, the semantics may be based on the semantics provided above with respect to Table 7 and for syntax elements bp_nal_hrd_parameters_present_flag, bp_vcl_hrd_parameters_present_flag, initial_cpb_removal_delay_length_minus1, bp_cpb_cnt_minus1[j], nal_initial_cpb_removal_delay[i][j], nal_initial_cpb_removal_offset[i][j], vcl_initial_cpb_removal_delay[i][j], and vcl_initial_cpb_removal_offset[i][j] in one example, the semantics may be based on the following:

bp_nal_hrd_parameters_present_flag equal to 1 specifies that a list of syntax element pairs nal_initial_cpb_removal_delay[i][j] and nal_initial_cpb_removal_offset[i][j] are present in the buffering period SEI message, bp_nal_hrd_parameters_present_flag equal to 0 specifies that no syntax element pairs nal_initial_cpb_removal_delay[i][j] and nal_initial_cpb_removal_offset[i][j] are present in the buffering period SEI message.

It is a requirement of bitstream conformance that the value of bp_nal_hrd_parameters_present_flag in the buffering period SET message associated with an access unit is equal to the value of vui_nal_hrd_parameters_present_flag in the VUI parameters of the active SPS.

bp_vcl_hrd_parameters_present_flag equal to 1 specifies that a list of syntax element pairs vcl_initial_cpb_removal_delay[i][j] and vcl_initial_cpb_removal_offset[i][j] are present in the buffering period SEI message. bp_vcl_hrd_parameters_present_flag equal to 0 specifies that no syntax element pairs vcl_initial_cpb_removal_delay[i][j] and vcl_initial_cpb_removal_offset[i][j] are present in the buffering period SET message.

It is a requirement of bitstream conformance that the value of bp_vcl_hrd_parameters_present_flag in the buffering period SEI message associated with an access unit is equal to the value of vui_vcl_hrd_parameters_present_flag in the VU parameters of the active SPS.

initial_cpb_removal_delay_length_minus1 plus 1 specifies the length, in bits, of the syntax elements nal_initial_cpb_removal_delay[i][j], nal_initial_cpb_removal_offset[i][j], vcl_initial_cpb_removal_delay[i][j], and vcl_initial_cpb_removal_offset[i][j] of the buffering period SEI message. When not present, the value of initial_cpb_removal_delay_length_minus1 is inferred to be equal to 23.

bp_cpb_cnt_minus1[j] plus 1 specifies the number of syntax element pairs nal_initial_cpb_removal_delay[i][j] and nal_initial_cpb_removal_offset[i][j] for the j-th temporal sub-layer representation when bp_nal_hrd_parameters_present_flag is equal to 1, and the number of syntax element pairs vcl_initial_cpb_removal_delay[i][j] and vcl_initial_cpb_removal_offset[i][j] for the j-th temporal sub-layer representation when bp_vcl_hrd_parameters_present_flag is equal to 1. The value of bp_cpb_cnt_minus1[j] shall be in the range of 0 to 31, inclusive.

nal_initial_cpb_removal_delay[i][j] specify the i-th initial CPB removal delay for the NALHRD in units of a 90 kHz clock for the j-th temporal sub-layer representation. The length of nal_initial_cpb_removal_delay[i][j] is initial_cpb_removal_delay_length_minus1+1 bits. The value of nal_initial_cpb_removal_delay[i][j] shall not be equal to 0 and shall be less than or equal to 90000*(CpbSize[i]+BitRate[i]), the time-equivalent of the CPB size in 90 kHz clock units, where BitRate[i], CpbSize[i] are obtained respectively from equations provided above by setting HighestTid value equal to j.

nal_initial_cpb_removal_offset[i][j] specify the i-th initial CPB removal offset for the NAL HRD in units of a 90 kHz clock for the j-th temporal sub-layer representation. The length of nal_initial_cpb_removal_offset[i][j] is initial_cpb_removal_delay_length_minus1+1 bits.

Over the entire CVS, the sum of nal_initial_cpb_removal_delay[i][j] and nal_initial_cpb_removal_offset[i][j] shall be constant for each value of i and for each value of j.

vcl_initial_cpb_removal_delay[i][j] specify the i-th initial CPB removal delay for the VCL HRD in units of a 90 kHz clock for the j-th temporal sub-layer representation. The length of vcl_initial_cpb_removal_delay[i][j] is initial_cpb_removal_delay_length_minus1+1 bits. The value of vcl_initial_cpb_removal_delay[i][j] shall not be equal to 0 and shall be less than or equal to 90000*(CpbSize[i]+BitRate[i]), the time-equivalent of the CPB size in 90 kHz clock units, where BitRate[i], CpbSize[i] are obtained respectively from equations provided above by setting HighestTid value equal to j.

vcl_initial_cpb_removal_offset[i][j] specify the i-th initial CPB removal offset for the VCL HRD in units of a 90 kHz clock for the j-th temporal sub-layer representation. The length of vcl_initial_cpb_removal_offset[i][j] is initial_cpb_removal_delay_length_minus1+1 bits.

Over the entire CVS, the sum of vcl_initial_cpb_removal_delay[i][j] and vcl_initial_cpb_removal_offset[i][j] shall be constant for each value of i and for each value of j.

It should be noted that in one example, the term "for the j-th temporal sub-layer representation" may be replaced with the term "that applies to HighestTid equal to j."

Further, in one example, a flag is signaled and depending upon the flag value initial CPB removal delays are signaled only or the entire bitstream/CVS or for each temporal sub-layer representation for the bitstream/CVS. Table 12 illustrates an example of an buffering period SEI message syntax structure, which may be signaled according to this example.

TABLE 12

| | Descriptor |
|---|---|
| buffering_period( payloadSize ) { | |
|   bp_seq_parameter_set_id | ue(v) |
|   bp_nal_hrd_parameters_present_flag | u(1) |
|   bp_vcl_hrd_parameters_present_flag | u(1) |
|   if( bp_nal_hrd_parameters_present_flag \|\| bp_vcl_hrd_parameters_present_flag ) { | |
|     initial_cpb_removal_delay_length_minus1 | u(5) |
|     cpb_removal_delay_length_minus1 | u(5) |
|     dpb_output_delay_length_minus1 | u(5) |
|   } | |
|   concatenation_flag | u(1) |
|   cpb_removal_delay_delta_minus1 | u(v) |
|   cpb_removal_delay_deltas_present_flag | u(1) |
|   if( cpb_removal_delay_deltas_present_flag ) { | |
|     num_cpb_removal_delay_deltas_minus1 | ue(v) |
|     for( i = 0; i <= num_cpb_removal_delay_deltas_minus1; i++ ) | |
|       cpb_removal_delay_delta[ i ] | u(v) |
|   } | |
|   sub_layer_initial_cpb_removal_delay_present_flag | u(1) |
|   for(j = (sub_layer_initial_cpb_removal_delay_present_flag? 0 : sps_max_sub_layers_minus1 ); j <= sps_max_sub_layers_minus1; j++ ) { | |
|     bp_cpb_cnt_minus1 [ j ] | ue(v) |
|     if( bp_nal_hrd_parameters_present_flag ) | |
|       for( i = 0; i < bp_cpb_cnt_minus1[ j ] + 1; i++ ) { | |
|         nal_initial_cpb_removal_delay[ i ] [ j ] | u(v) |
|         nal_initial_cpb_removal_offset[ i ] [ j ] | u(v) |
|       } | |

TABLE 12-continued

| | Descriptor |
|---|---|
| if( bp_vcl_hrd_parameters_present_flag )     for( i = 0; i < bp_cpb_cnt_minus1[ j ] + 1; i++ ) {        vcl_initial_cpb_removal_delay[ i ] [ j ]        vcl_initial_cpb_removal_offset[ i ] [ j ]     }   } } |     u(v) u(v) |

With respect to Table 12, the semantics may be based on the semantics provided above with respect to Table 11 and for syntax element
    sub_layer_initial_cpb_removal_delay_present_flag in one example, the semantics may be based on the following:
    sub_layer_initial_cpb_removal_delay_present_flag equal to 1 specifies that initial CPB removal delay related syntax elements (i.e. nal_initial_cpb_removal_delay[i][j], nal_initial_cpb_removal_offset[i][j] when bp_nal_hrd_parameters_present_flag is equal to 1 and vcl_initial_cpb_removal_delay[i][j], vcl_initial_cpb_removal_offset[i][j] when bp_vcl_hrd_parameters_present_flag is equal to 1) are present for temporal sub-layer representation(s) in the range of 0 to sps_max_sub_layers_minus1, inclusive. sub_layer_initial_cpb_removal_delay_present_flag equal to 0 specifies that initial CPB removal delay related syntax elements (i.e. nal_initial_cpb_removal_delay[i][j], nal_initial_cpb_removal_offset[i][j] when bp_nal_hrd_parameters_present_flag is equal to 1 and vcl_initial_cpb_removal_delay[i][j], vcl_initial_cpb_removal_offset[i][j] when bp_vcl_hrd_parameters_present_flag is equal to 1) are present only for the sps_max_sub_layers_minus1'th temporal sub-layer representation.

In one example, the term "temporal sub-layer representation(s) in the range of 0 to sps_max_sub_layers_minus1, inclusive" may be replaced with terms, "temporal sub-layer representation(s) in the range of 0 to HighestTid, inclusive," or "temporal sub-layer representation(s) in the range of TemporalId to sps_max_sub_layers_minus1, inclusive," or "temporal sub-layer representation(s) in the range of TemporalId to HighestTid, inclusive."

Further, with respect to Table 11 and Table 12, in one example, one or more of the following modifications may be made to the syntax:
The loop
  for(j=0; j<=sps_max_sub_layers_minus1; j++)
may be replaced with the loop
  for(j=0; j<=HighestTid; j++);
The loop
  for(j=(sub_layer_initial_cpb_removal_delay_present_flag?0:sps_max_sub_layers_minus1);
j<=sps_max_sub_layers_minus1; j++)
may be replaced with the loop
  for(j=(sub_layer_initial_cpb_removal_delay_present_flag?0:HighestTid); j<=HighestTid; j++);
The loop
  for(j=0; j<=sps_max_sub_layers_minus1; j++)
may be replaced with the loop
  for(j=TemporalId; j<=sps_max_sub_layers_minus1; j++;
The loop
  for(j=(sub_layer_initial_cpb_removal_delay_present_flag?0:sps_max_sub_layers_minus1);
j<=sps_max_sub_layers_minus1; j++)
may be replaced with the loop
  for(j=(sub_layer_initial_cpb_removal_delay_present_flag? TemporalId: sps_max_sub_layers_minus1):
j<=HighestTid; j++);

The loop
  for(j=0; j<=sps_max_sub_layers_minus1; j++)
may be replaced with the loop
  for(j=TemporalId; j<=HighestTid; j++); and/or
The loop
  for(j=(sub_layer_initial_cpb_removal_delay_present_flag?0:sps_max_sub_layers_minus1);
j<=sps_max_sub_layers_minus1; j++)
may be replaced with the loop
  for(j=(sub_layer_initial_cpb_removal_delay_present_flag? TemporalId:HighestTid); j<=HighestTid; j++)

In one example, according to the techniques herein, the variables InitCpbRemovalDelay[SchedSelIdx] and InitCpbRemovalDelayOffset[SchedSelIdx] which provide an initial CPB removal delay and an initial CPB removal delay offset may be derived as follows:
    InitCpbRemovalDelay[SchedSelIdx] and InitCpbRemovalDelayOffset[SchedSelIdx] are set equal to the values of the buffering period SEI message syntax elements nal_initial_cpb_removal_delay[SchedSelIdx][HighestTid] and nal_initial_cpb_removal_offset[SchedSelIdx][HighestTid], respectively, when NalHrdModeFlag is equal to 1, or vcl_initial_cpb_removal_delay[SchedSelIdx][HighestTid] and vcl_initial_cpb_removal_offset[SchedSelIdx][HighestTid], respectively, when NalHrdModeFlag is equal to 0, where the buffering period SEI message syntax elements are selected as follows:

For each access unit in BitstreamToDecode starting from access unit 0, the buffering period SEI message (present in BitstreamToDecode or available through external means not specified in this Specification) that is associated with the access unit and applies to TargetOp is selected, and the picture timing SEI message (present in BitstreamToDecode or available through external means not specified in this Specification) that is associated with the access unit and applies to TargetOp is selected. The selected buffering period and picture timing SEI messages shall be either SEI messages or provided by external means.

In one example, according to the techniques herein, the variables InitCpbRemovalDelay[SchedSelIdx], and InitCpbRemovalDelayOffsett[SchedSelIdx], which provide an initial CPB removal delay and an initial CPB removal delay offset may be derived as follows:
    InitCpbRemovalDelay[SchedSelIdx] and InitCpbRemovalDelayOffset[SchedSelIdx] are set equal to the values of the buffering period SEI message syntax elements nal_initial_cpb_removal_delay[SchedSelIdx][HighestTid] and nal_initial_cpb_removal_offset[SchedSelIdx][HighestTid], respectively, when NalHrdModeFlag is equal to 1, or vcl_initial_cpb_removal_delay[SchedSelIdx][HighestTid] and vcl_initial_cpb_removal_offset[SchedSelIdx][HighestTid], respectively, when NalHrdModeFlag is equal to 0, where the buffering period SEI message containing the syntax elements is selected as specified as follows:

For each access unit in BitstreamToDecode starting from access unit 0, the buffering period SEI message (present in BitstreamToDecode or available through external means not specified in this Specification) that is associated with the access unit and applies to TargetOp is selected, and the picture timing SEI message (present in BitstreamToDecode or available through external means not specified in this Specification) that is associated with the access unit and applies to TargetOp is selected. The selected buffering period and picture timing SEI messages shall be either SEI messages or provided by external means.

Further, in one example, according to the techniques herein, the BitRate and CpbSize values for each temporal sub-layer representation may be calculated separately and kept track of separately and use the appropriate variable values during the operation. Currently, without this change in JVET-N1001, there is some unclarity when BitRate and CpbSize values are used for different HighestTid values. It is asserted that the proposed changes below makes the specification text unambiguous.

Table 13 illustrates an example of an sub_layer_hrd_parameters( ) syntax structure, which may be signaled according to this example.

TABLE 13

|  | Descriptor |
| --- | --- |
| sub_layer_hrd_parameters( subLayerId ) { | |
|   for( i = 0; i <= CpbCnt; i++ ) { | |
|     bit_rate_value_minus1[ i ][ subLayerId ] | ue(v) |
|     cpb_size_value_minus1[ i ][ subLayerId ] | ue(v) |
|     cbr_flag[ i ][ subLayerId ] | u(1) |
|   } | |
| } | |

With respect to Table 13, in one example, the following semantics may be used for sub_layer_hrd_parameters( ) syntax structure:

The variable CpbCnt is set equal to vui_cpb_cnt_minus1[subLayerId].

bit_rate_value_minus1[i][subLayerId] (together with bit_rate_scale) specifies the maximum input bit rate for the i-th CPB with HighestTid equal to subLayerId when the CPB operates at the access unit level. bit_rate_value_minus1[i][subLayerId] shall be in the range of 0 to $2^{32}-2$, inclusive. For any i>0, bit_rate_value_minus1[i][subLayerId] shall be greater than bit_rate_value_minus1[i-1][subLayerId].

The bit rate in bits per second is given by:

$$BitRate[i][subLayerId]=(bit\_rate\_value\_minus1[i][subLayerId]+1)*2^{(6+bit\_rate\_scale)}$$

When the bit_rate_value_minus1[i][subLayerId] syntax element is not present, the value of BitRate[i][subLayerId] is inferred to be equal to CpbBrVclFactor*MaxBR for VCL HRD parameters and to be equal to CpbBrNalFactor*MaxBR for NAL HRD parameters, where MaxBR, CpbBrVclFactor and CpbBrNalFactor are specified, for example, as provided above].

cpb_size_value_minus1[i][subLayerId] is used together with cpb_size_scale to specify the i-th CPB size with HighestTid equal to subLayerId when the CPB operates at the access unit level, cpb_size_value_minus1[i][subLayerId] shall be in the range of 0 to $2^{32}-2$, inclusive. For any i greater than 0, cpb_size_value_minus1[i][subLayerId] shall be less than or equal to cpb_size_value_minus1[i-1][subLayerId].

The CPB size in bits is given by:

$$CpbSize[i][subLayerId]=(cpb\_size\_value\_minus1[i][subLayerId]+1)*2^{(4+cpb\_size\_scale)}$$

When the cpb_size_value_minus1[i][subLayerId] syntax element is not present, the value of CpbSize[i][subLayerId] is inferred to be equal to CpbBrVclFactor*MaxCPB for VCL HRD parameters and to be equal to CpbBrNalFactor*MaxCPB for NAL HRD parameters, where MaxCPB, CpbBrVclFactor and CpbBrNalFactor are specified, for example, as provided above.]

cbr_flag[i][subLayerId] equal to 0 specifies that to decode this bitstream by the HRD using the i-th CPB specification with HighestTid equal to subLayerId, the hypothetical stream scheduler (HSS) operates in an intermittent bit rate mode. cbr_flag[i][subLayerId] equal to 1 specifies that the HSS operates in a constant bit rate (CBR) mode with HighestTid equal to subLayerId. When not present, the value of cbr_flag[i][subLayerId] is inferred to be equal to 0.

Further, for syntax elements bit_rate_scale and cpb_size_scale in hrd_parameters( ) syntax structure, in one example, the semantics may be based on the following:

bit_rate_scale (together with bit_rate_value_minus1[i][subLayerId]) specifies the maximum input bit rate of the i-th CPB.

cpb_size_scale (together with cpb_size_value_minus1[i][subLayerId]) specifies the CPB size of the i-th CPB when the CPB operates at the access unit level.

Further, for syntax elements nal_initial_cpb_removal_delay[i][j], nal_initial_cpb_removal_offset[i][j], and vcl_initial_cpb_removal_delay[i][j] in buffering period SEI message syntax structure, in one example, the semantics may be based on the following:

nal_initial_cpb_removal_delay[i][j] specify the i-th initial CPB removal delay for the NAL HRD in units of a 90 kHz clock for the j-th temporal sub-layer representation. The length of nal_initial_cpb_removal_delay[i][j] is initial_cpb_removal_delay_length_minus1+1 bits. The value of nal_initial_cpb_removal_delay[i][j] shall not be equal to 0 and shall be less than or equal to 90000*(CpbSize[i][j]÷BitRate[i][j]), the time-equivalent of the CPB size in 90 kHz clock units.

nal_initial_cpb_removal_offset[i][j] specify the i-th initial CPB removal offset for the NAL HRD in units of a 90 kHz clock for the j-th temporal sub-layer representation. The length of nal_initial_cpb_removal_offset[i][j] is initial_cpb_removal_delay_length_minus1+1 bits.

Over the entire CVS, the sum of nal_initial_cpb_removal_delay[i][j] and nal_initial_cpb_removal_offset[i][j] shall be constant for each value of i and for each value of j.

vcl_initial_cpb_removal_delay[i][j] specify the i-th initial CPB removal delay for the VCL HRD in units of a 90 kHz clock for the j-th temporal sub-layer representation. The length of vcl_initial_cpb_removal_delay[i][j] is initial_cpb_removal_delay_length_minus1+1 bits. The value of vcl_initial_cpb_removal_delay[i][j] shall not be equal to 0 and shall be less than or equal to 90000*(CpbSize[i][j]÷BitRate[i][j]), the time-equivalent of the CPB size in 90 kHz clock units.

In another example, for syntax elements nal_initial_cpb_removal_delay[i][j] nal_initial_cpb_removal_offset[i][j], and vcl_initial_cpb_removal_delay[i][j] in a buffering period SEI message syntax structure, the semantics may be based on the following:

bp_cpb_cnt_minus1 plus 1 specifies the number of syntax element pairs nal_initial_cpb_removal_delay[i] and nal_initial_cpb_removal_offset[i] when bp_nal_hrd_parameters_present_flag is equal to 1, and the number of syntax element pairs vcl_initial_cpb_removal_delay[i] and vcl_initial_cpb_removal_offset[i] when bp_vcl_hrd_parameters_present_flag is equal to 1. The value of bp_cpb_cnt_minus1 shall be in the range of 0 to 31, inclusive.

nal_initial_cpb_removal_delay[i] specify the i-th initial CPB removal delay for the NAL HRD in units of a 90 kHz clock. The length of nal_initial_cpb_removal_delay[i] is initial_cpb_removal_delay_length_minus1+1 bits. The value of nal_initial_cpb_removal_delay[i] shall not be equal to 0 and shall be less than or equal to 90000*(CpbSize[i][HighestTid]÷BitRate[i][HighestTid]), the time-equivalent of the CPB size in 90 kHz clock units.

nal_initial_cpb_removal_offset[i] specify the i-th initial CPB removal offset for the NAL HRD in units of a 90 kHz clock. The length of nal_initial_cpb_removal_offset[i] is initial_cpb_removal_delay_length_minus1+1 bits.

Over the entire CVS, the sum of nal_initial_cpb_removal_delay[i] and nal_initial_cpb_removal_offset[i] shall be constant for each value of i.

vcl_initial_cpb_removal_delay[i] specify the i-th initial CPB removal delay for the VCL HRD in units of a 90 kHz clock. The length of vcl_initial_cpb_removal_delay[i] is initial_cpb_removal_delay_length_minus1+1 bits. The value of vcl_initial_cpb_removal_delay[i] shall not be equal to 0 and shall be less than or equal to 90000*(CpbSize[i][HighestTid]÷BitRate[i][HighestTid]), the time-equivalent of the CPB size in 90 kHz clock units.

vcl_initial_cpb_removal_offset[i] specify the i-th initial CPB removal offset for the VCL HRD in units of a 90 kHz clock. The length of vcl_initial_cpb_removal_offset[i] is initial_cpb_removal_delay_length_minus1+1 bits.

Over the entire CVS, the sum of vcl_initial_cpb_removal_delay[i] and vcl_initial_cpb_removal_offset[i] shall be constant for each value of i.

Further, in one example, according to the techniques herein, the final arrival time for an access unit m may be derived as follows:

$$FinalArrivalTime[m] = initArrivalTime[m] + sizeInbits[m] \div BitRate[SchedSelIdx][HighestTid]$$

where sizeInbits[m] is the size in bits of access unit m, counting the bits of the VCL NAL units and the filler data NAL units for the Type I conformance point or all bits of the Type II bitstream for the Type II conformance point.

Further, in one example, according to the techniques herein, the values of SchedSelIdx, BitRate[SchedSelIdx][HighestTid] and CpbSize[SchedSelIdx][HighestTid] may be constrained as follows:

If the content of the selected hrd_parameters( ) syntax structures for the access unit containing access unit m and the previous access unit differ, the HSS selects a value SchedSelIdx1 of SchedSelIdx from among the values of SchedSelIdx provided in the selected hrd_parameters( ) syntax structures for the access unit containing access unit m that results in a BitRate[SchedSelIdx1][HighestTid] or CpbSize[SchedSelIdx1][HighestTid] for the access unit containing access unit m. The value of BitRate[SchedSelIdx1][HighestTid] or CpbSize[SchedSelIdx1][HighestTid] may differ from the value of BitRate[SchedSelIdx0][HighestTid] or CpbSize[SchedSelIdx0][HighestTid] for the value SchedSelIdx0 of SchedSelIdx that was in use for the previous access unit.

Otherwise, the HSS continues to operate with the previous values of SchedSelIdx, BitRate[SchedSelIdx][HighestTid] and CpbSize[SchedSelIdx][HighestTid].

When the HSS selects values of BitRate[SchedSelIdx][HighestTid] or CpbSize[SchedSelIdx][HighestTid] that differ from those of the previous access unit, the following applies:

The variable BitRate[SchedSelIdx][HighestTid] comes into effect at the initial CPB arrival time of the current access unit.

The variable CpbSize[SchedSelIdx][HighestTid] comes into effect as follows:

If the new value of CpbSize[SchedSelIdx][HighestTid] is greater than the old CPB size, it comes into effect at the initial CPB arrival time of the current access unit.

Otherwise, the new value of CpbSize[SchedSelIdx][HighestTid] comes into effect at the CPB removal time of the current access unit.

Further, in one example, according to the techniques herein, when the HRD parameters and the buffering period SEI messages are present with vui_cpb_cnt_minus1[HighestTid] greater than 0, a decoder shall be capable of decoding the bitstream as delivered from the HSS operating using an "interpolated" delivery schedule specified as having peak bit rate r, CPB size c(r) and initial CPB removal delay (f(r)÷r) as follows:

$$\alpha = (r - BitRate[SchedSelIdx-1][HighestTid]) \div (BitRate[SchedSelIdx][HighestTid] - BitRate[SchedSelIdx-1][HighestTid]),$$

$$c(r) = \alpha * CpbSize[SchedSelIdx][HighestTid] + (1-\alpha) * CpbSize[SchedSelIdx-1][HighestTid],$$

$$f(r) = \alpha * InitCpbRemovalDelay[SchedSelIdx] * BitRate[SchedSelIdx][HighestTid] + (1-\alpha) * InitCpbRemovalDelay[SchedSelIdx-1] * BitRate[SchedSelIdx-1][HighestTid]$$

for any SchedSelIdx>0 and r such that BitRate[SchedSelIdx-1][HighestTid]<=r<=BitRate[SchedSelIdx][HighestTid] such that r and c(r) are within the limits as specified, for example, with respect to Table 10, for the maximum bit rate and buffer size for the specified profile, tier and level.

Referring to Table 3, it should be noted that the syntax elements num_units_in_tick and time_scale are used to derive a variable ClockTick which is used for HRD operation. As such, it is not meaningful to signal these two syntax elements, but not signal HRD parameters (hrd_parameters). In one example, according to the techniques herein, syntax elements num_units_in_tick and time_scale may be conditionally signaled based on hrd_parameters_present_flag, which provides a simplification to the syntax and improves coding efficiency. Table 14 illustrates an example of syntax of a sequence parameter set, which may be signaled according to the techniques herein.

TABLE 14

|  | Descriptor |
|---|---|
| seq_parameter_set_rbsp( ) { |  |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) |  |
|   ... |  |
|   sps_ladf_enabled_flag | u(1) |
|   if ( sps_ladf_enabled_flag ) { |  |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { |  |
|       sps_ladf_qp_offset[ i ] | se(v) |
|       sps_ladf_delta_threshold_minus1[ i ] | ue(v) |
|     } |  |
|   } |  |
|   hrd_parameters_present_flag | u(1) |
|   if( hrd_parameters_present_flag ) { |  |
|     num_units_in_tick | u(32) |
|     time_scale | u(32) |
|     hrd_parameters(sps_max_sub_layers_minus1 ) |  |
| } |  |

TABLE 14-continued

| | Descriptor |
|---|---|
| vui_parameters_present_flag | u(1) |
| if( vui_parameters_present_flag ) | |
|   vui_parameters( ) | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

With respect to Table 14, the semantics may be based on the semantics provided above with respect to Table 3, for syntax element hrd_parameters_present_flag, in one example, the following semantics may be used:

hrd_parameters_present_flag equal to 1 specifies that the syntax elements num_units_in_tick, time_scale, and syntax structure hrd_parameters( ) is present in the SPS RBSP syntax structure, hrd_parameters_present_flag equal to 0 specifies that the syntax elements num_units_in_tick, time_scale, and syntax structure hrd_parameters( ) is not present in the SPS RBSP syntax structure.

It should be noted that in one example, the flag hrd_parameters_present_flag may be called hrd_and_timing_info_parameters_present_flag or hrd_timing_parameters_present_flag or hrd_and_timing_parameters_present_flag.

Further, it should be noted that for each of syntax elements num_units_in_tick and time_scale a value of 0 is not meaningful and is not allowed. According to the techniques herein, in one example, one or both of syntax elements num_units_in_tick and time_scale may be coded using minus one coding. According to the techniques herein, instances of num_units_in_tick and/or time_scale in the Tables above may be replaced with syntax elements num_units_in_tick_minus1 and/or time_scale_minus1 having semantics based on the following:

num_units_in_tick_minus1 plus 1 is the number of time units of a clock operating at the frequency time_scale Hz that corresponds to one increment (called a clock tick) of a clock tick counter. A clock tick, in units of seconds, is equal to the quotient of num_units_in_tick divided by time_scale. For example, when the picture rate of a video signal is 25 Hz, time_scale may be equal to 27 000 000 and num_units_in_tick may be equal to 1 080 000, and consequently a clock tick may be equal to 0.04 seconds.

time_scale_minus1 plus 1 is the number of time units that pass in one second. For example, a time coordinate system that measures time using a 27 MHz clock has a time_scale of 27 000 000.

In one example, with the techniques described above the syntax of related parameters may be as shown in Table 15.

TABLE 15

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   ... | |
|   sps_ladf_enabled_flag | u(1) |
|   if ( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; | |

TABLE 15-continued

| | Descriptor |
|---|---|
|     i++ ) { | |
|       sps_ladf_qp_offset[ i ] | se(v) |
|       sps_ladf_delta_threshold_minus1[ i ] | ue(v) |
|     } | |
|   } | |
|   hrd_parameters_present_flag | u(1) |
|   if( hrd_parameters_present_flag ) { | |
|     num_units_in_tick_minus1 | u(32) |
|     timee_scale_minus1 | u(32) |
|     hrd_parameters(sps_max_sub_layers_minus1 ) | |
|   } | |
|   vui_parameters_present_flag | u(1) |
|   if( vui_parameters_present_flag ) | |
|     vui_parameters( ) | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

In this manner, source device 102 represents an example of a device configured to signal a flag, wherein the value of the flag indicates whether respective instances of HRD parameters are signaled for each temporal sub-layers of video data or whether a single instance of HRD parameters is signaled for the all the temporal sub-layers of the video data, and signal a number of instances of HRD parameters according to the number temporal sub-layers of the video data and the value of the flag.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, PC, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, PC, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
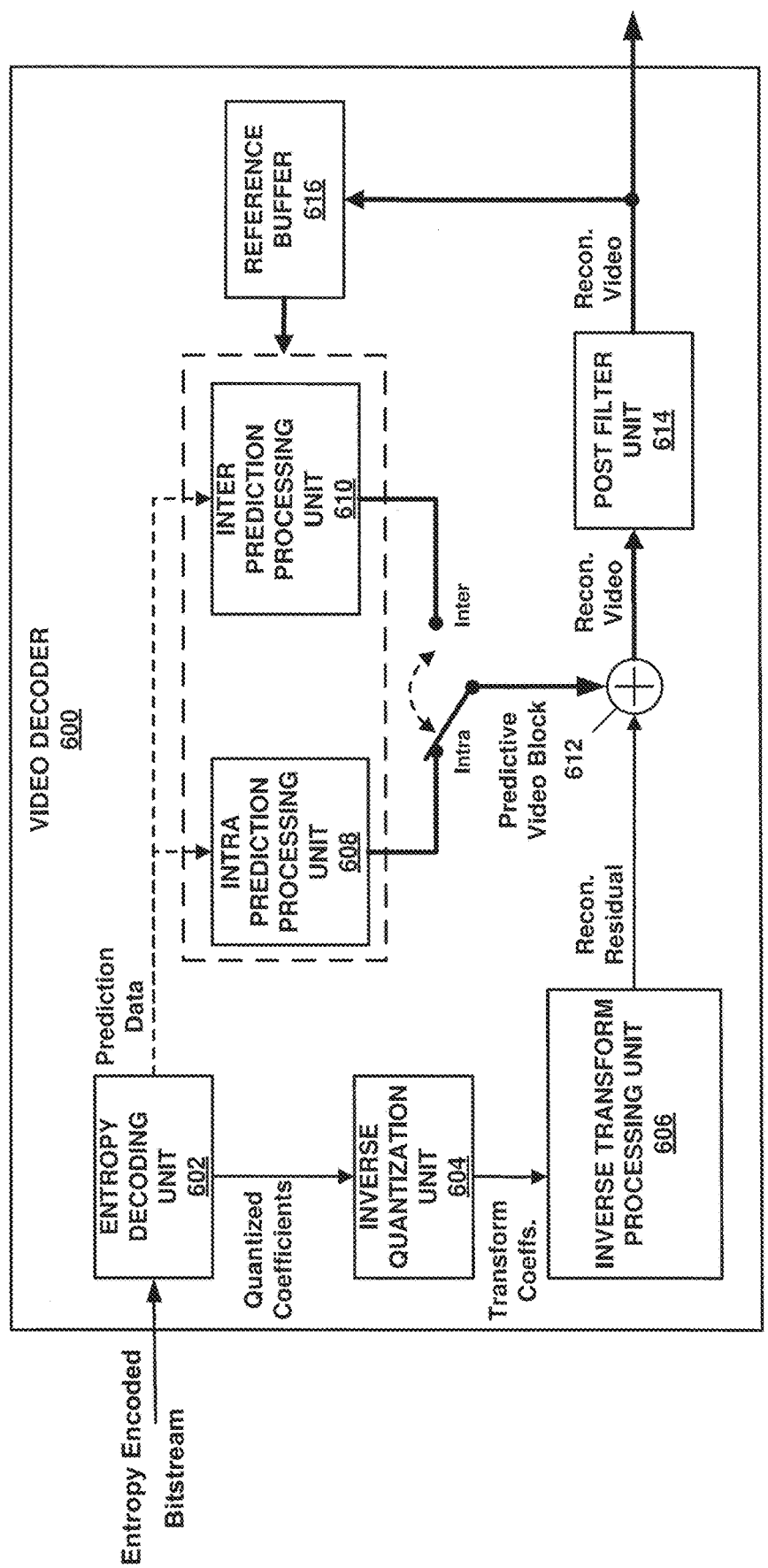
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure (e.g., the decoding process for reference-picture list construction described above). In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-15. Video decoder 600 may decode a picture based on or according to the processes described above.

In the example illustrated in FIG. 6, video decoder 600 includes an entropy decoding unit 602, inverse quantization unit and transform coefficient processing unit 604, intra prediction processing unit 606, inter prediction processing unit 608, summer 610, post filter unit 612, and reference buffer 614. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and predication data from a bitstream. In the example, illustrated in FIG. 6, inverse quantization unit and transform coefficient processing unit 604 receives a quantization parameter, quantized coefficient values, transform data, and predication data from entropy decoding unit 602 and outputs reconstructed residual data.

Referring again to FIG. 6, reconstructed residual data may be provided to summer 610 Summer 610 may add reconstructed residual data to a predictive video block and generate reconstructed video data. A predictive video block may be determined according to a predictive video technique (i.e., intra prediction and inter frame prediction). Intra prediction processing unit 606 may be configured to receive intra prediction syntax elements and retrieve a predictive video block from reference buffer 614. Reference buffer 614 may include a memory device configured to store one or more frames of video data. Intra prediction syntax elements may identify an intra prediction mode, such as the intra prediction modes described above. Inter prediction processing unit 608 may receive inter prediction syntax elements and generate motion vectors to identify a prediction block in one or more reference frames stored in reference buffer 616. Inter prediction processing unit 608 may produce motion compensated blocks, possibly performing interpolation based on interpolation filters. Identifiers for interpolation filters to be used for motion estimation with sub-pixel precision may be included in the syntax elements. Inter prediction processing unit 608 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to parse a flag indicating whether respective instances of HRD parameters are signaled for each temporal sub-layers of video data or whether a single instance of HRD parameters is signaled for the all the temporal sub-layers of the video data, and parse a number of instances of HRD parameters according to the number temporal sub-layers of the video data and the value of the flag.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM. EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

SUMMARY

In one example, a method of signaling hypothetical reference decoder (HRD) parameters for decoding video data, the method comprising: signaling a flag, wherein the value of the flag indicates whether respective instances of HRD parameters are signaled for each temporal sub-layers of video data or whether a single instance of HRD parameters is signaled for the all the temporal sub-layers of the video data; and signaling a number of instances of HRD parameters according to the number temporal sub-layers of the video data and the value of the flag.

In one example, a method of decoding video data, the method comprising: parsing a flag indicating whether respective instances of HRD parameters are signaled for each temporal sub-layers of video data or whether a single instance of HRD parameters is signaled for the all the temporal sub-layers of the video data; and parsing a number of instances of HRD parameters according to the number temporal sub-layers of the video data and the value of the flag.

In one example, the method, wherein the flag is included in a sequence parameter set.

In one example, a device comprising one or more processors configured to perform any and all combinations of the steps.

In one example, the device, wherein the device includes a video encoder.

In one example, the device, wherein the device includes a video decoder.

In one example, a system comprising: the device includes a video encoder, and the device includes a video decoder.

In one example, an apparatus comprising means for performing any and all combinations of the steps.

In one example, a non-transitory computer-readable storage medium comprising instructions stored thereon that, when executed, cause one or more processors of a device to perform any and all combinations of the steps.

In one example, a method of decoding video data, the method comprising: decoding a first syntax element in a sequence parameter set, wherein the first syntax element specifies whether a hypothetical reference decoder parameters syntax structure includes parameters for a temporal sub-layer with an identifier in a range of 0 to a maximum number of temporal sub-layers minus one or a hypothetical reference decoder parameters syntax structure includes parameters for a temporal sub-layer with an identifier equal to a maximum number of temporal sub-layers minus one only; defining a starting sub-layer for the hypothetical reference decoder parameters syntax structure according to a value of the first syntax element; and decoding each of the parameters in the hypothetical reference decoder parameters syntax structure by using the starting sub-layer and a maximum number of sub-layers.

In one example, the method, wherein the first syntax element is a sub-layer coded picture buffer parameters present flag.

In one example, the method, wherein the hypothetical reference decoder parameters syntax structure includes a sub-layer hypothetical reference decoder parameters syntax structure.

In one example, the method, wherein the sub-layer HRD parameter syntax structure includes a second syntax element specifying a maximum input bit rate for a coded picture buffer with a highest temporal identifier equal to a corresponding identifier when the coded picture buffer operates at an access unit level.

In one example, the method, wherein the second syntax element is a bit rate value minus one syntax element.

In one example, the method, wherein the sub-layer HRD parameter syntax structure includes a third syntax element specifying a coded picture buffer size with a highest temporal identifier equal to a corresponding identifier when the coded picture buffer operates at an access unit level.

In one example, the method, wherein the third syntax element is a coded picture buffer size value minus one syntax element.

In one example, a method of encoding image data, the method comprising: encoding a first syntax element in a sequence parameter set, wherein the first syntax element specifies whether a hypothetical reference decoder parameters syntax structure includes parameters for a temporal sub-layer with an identifier in a range of 0 to a maximum number of temporal sub-layers minus one or a hypothetical reference decoder parameters syntax structure includes parameters for a temporal sub-layer with an identifier equal to a maximum number of temporal sub-layers minus one only; defining a starting sub-layer for the hypothetical reference decoder parameters syntax structure according to a value of the first syntax element; and encoding each of the parameters in the hypothetical reference decoder parameters syntax structure by using the starting sub-layer and a maximum number of sub-layers.

In one example, a decoder of decoding video data, the decoder comprising: a processor, and a memory associated with the processor; wherein the processor is configured to perform the following steps: decoding a first syntax element in a sequence parameter set, wherein the first syntax element specifies whether a hypothetical reference decoder parameters syntax structure includes parameters for a temporal sub-layer with an identifier in a range of 0 to a maximum number of temporal sub-layers minus one or a hypothetical reference decoder parameters syntax structure includes parameters for a temporal sub-layer with an identifier equal to a maximum number of temporal sub-layers minus one only; defining a starting sub-layer for the hypothetical reference decoder parameters syntax structure according to a value of the first syntax element; and decoding each of the parameters in the hypothetical reference decoder parameters syntax structure by using the starting sub-layer and a maximum number of sub-layers.

In one example, a encoder of encoding video data, the encoder comprising: a processor, and a memory associated with the processor; wherein the processor is configured to perform the following steps: encoding a first syntax element in a sequence parameter set, wherein the first syntax element specifies whether a hypothetical reference decoder parameters syntax structure includes parameters for a temporal sub-layer with an identifier in a range of 0 to a maximum number of temporal sub-layers minus one or a hypothetical reference decoder parameters syntax structure includes parameters for a temporal sub-layer with an identifier equal to a maximum number of temporal sub-layers minus one only; defining a starting sub-layer for the hypothetical reference decoder parameters syntax structure according to a value of the first syntax element; and encoding each of the parameters in the hypothetical reference decoder parameters syntax structure by using the starting sub-layer and a maximum number of sub-layers.

The invention claimed is:

1. A method of decoding video data, the method comprising:
    decoding a first syntax element in a sequence parameter set, wherein the first syntax element specifies a hypothetical reference decoder parameters syntax structure includes parameters for a temporal sub-layer with an identifier in a range of 0 to a value of a maximum number of temporal sub-layers minus one syntax element or a hypothetical reference decoder parameters syntax structure includes parameters for a temporal sub-layer with an identifier equal to a value of a maximum number of temporal sub-layers minus one syntax element only;
    selecting a starting sub-layer for the hypothetical reference decoder parameters syntax structure according to a value of the first syntax element; and
    decoding each of the parameters in the hypothetical reference decoder parameters syntax structure by using the starting sub-layer and the value of the maximum number of temporal sub-layers minus one syntax element.

2. The method of claim 1, wherein the first syntax element s a sub-layer coded picture buffer parameters present flag.

3. A method of encoding image data, the method comprising:
    encoding a first, syntax element in a sequence parameter set, wherein the first syntax element specifies a hypothetical reference decoder parameters syntax structure includes parameters for a temporal sub-layer with an identifier in a range of 0 to a value of a maximum number of temporal sub-layers minus one syntax element or a hypothetical reference decoder parameters syntax structure includes parameters for a temporal sub-layer with an identifier equal to a value of a maximum number of temporal sub-layers minus one syntax element only;
    selecting a starting sub-layer for the hypothetical reference decoder parameters syntax structure according to a value of the first syntax element; and
    encoding each of the parameters in the hypothetical reference decoder parameters syntax structure by using the starting sub-layer and the value of the maximum number of temporal sub-layers minus one syntax element.

4. A decoder of decoding video data, the decoder comprising:
    a processor, and
    a memory associated with the processor; wherein the processor is configured to:
    decode a first syntax element in a sequence parameter set, wherein the first syntax element specifies a hypothetical reference decoder parameters syntax structure includes parameters for a temporal sub-layer with an identifier in a range 0 to a value of a maximum number of temporal sub-layers minus one syntax element or a hypothetical reference decoder parameters syntax structure includes parameters for a temporal sub-layer with an identifier equal to a value of a maximum number of temporal sub-layers minus one syntax element only;
    select a starting sub-layer for the hypothetical reference decoder parameters syntax structure according to a value of the first syntax element; and
    decode each of the parameters in the hypothetical reference decoder parameters syntax structure by using the starting sub-layer and the value of the maximum number of temporal sub-layers minus one syntax element.

5. A encoder of encoding video data, the encoder comprising:
    a processor, and
    a memory associated with the processor; wherein the processor is configured to:
    encode a first syntax element in a sequence parameter set, wherein the first syntax element specifies a hypothetical reference decoder parameters syntax structure includes parameters for a temporal sub-layer with an identifier in a range of 0 to a value of a maximum number of temporal sub-layers minus one syntax element or a hypothetical reference decoder parameters syntax structure includes parameters for a temporal sub-layer with an identifier equal to a value of a maximum number of temporal sub-layers minus one syntax element only;

select a starting sub-layer for the hypothetical reference decoder parameters syntax structure according to a value of the first syntax element; and encode each of the parameters in the hypothetical reference decoder parameters syntax structure by using the starting sub-layer and the value of the maximum number of temporal sub-layers minus one syntax element.

* * * * *